(12) United States Patent
Sugaya

(10) Patent No.: US 10,841,067 B2
(45) Date of Patent: Nov. 17, 2020

(54) WIRELESS COMMUNICATION APPARATUS

(71) Applicant: Sony Corporation, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,450

(22) PCT Filed: Apr. 25, 2017

(86) PCT No.: PCT/JP2017/016373
§ 371 (c)(1),
(2) Date: Dec. 31, 2018

(87) PCT Pub. No.: WO2018/008237
PCT Pub. Date: Jan. 11, 2018

(65) Prior Publication Data
US 2019/0229876 A1   Jul. 25, 2019

(30) Foreign Application Priority Data

Jul. 7, 2016 (JP) .................................. 2016-134932

(51) Int. Cl.
*H04L 5/00* (2006.01)
*H04W 84/12* (2009.01)
(Continued)

(52) U.S. Cl.
CPC .............. *H04L 5/0055* (2013.01); *H04L 1/00* (2013.01); *H04L 1/16* (2013.01); *H04L 1/1685* (2013.01);
(Continued)

(58) Field of Classification Search
CPC . H04L 1/00; H04L 1/16; H04L 1/1614; H04L 1/1685; H04L 1/1825;
(Continued)

(56) References Cited

U.S. PATENT DOCUMENTS 6,792,470 B2 * 9/2004 Hakenberg ............ H04L 1/1678
375/E7.016
7,333,439 B2 * 2/2008 Itoh ........................ H04L 1/1838
370/252
(Continued)

FOREIGN PATENT DOCUMENTS

JP   2001-274861 A   10/2001
JP   2005-252897 A    9/2005
(Continued)

OTHER PUBLICATIONS

International Search Report dated Aug. 1, 2017 for PCT/JP2017/016373 filed on Apr. 25, 2017, 14 pages including english translation.

*Primary Examiner* — Man U Phan
(74) *Attorney, Agent, or Firm* — Xsensus LLP

(57) ABSTRACT

A data unit that requires a receipt acknowledgement response in a plurality of transmitted data units is suitably selected.
A wireless communication apparatus includes a control unit. The control unit controls transmission of receipt acknowledgement requests for a plurality of transmitted data units. Further, the receipt acknowledgement request whose transmission is controlled by the control unit is a receipt acknowledgement request including information, the information identifying a data unit that requires a receipt acknowledgement response in the plurality of transmitted data units and specifying the identified data unit.

18 Claims, 14 Drawing Sheets

(51) Int. Cl.
  *H04L 29/06* (2006.01)
  *H04L 1/00* (2006.01)
  *H04L 1/16* (2006.01)
  *H04W 28/04* (2009.01)
  *H04L 29/08* (2006.01)
  *H04L 1/18* (2006.01)
  *H04W 72/04* (2009.01)
  *H04W 72/10* (2009.01)

(52) U.S. Cl.
  CPC .......... *H04L 1/1825* (2013.01); *H04L 1/1877* (2013.01); *H04L 29/06* (2013.01); *H04L 29/08* (2013.01); *H04W 28/04* (2013.01); *H04W 72/0486* (2013.01); *H04W 72/10* (2013.01); *H04W 84/12* (2013.01); *H04L 1/1614* (2013.01); *H04L 1/188* (2013.01)

(58) Field of Classification Search
  CPC ..... H04L 1/1877; H04L 1/188; H04L 5/0055; H04L 29/06; H04L 29/08; H04L 5/00; H04W 28/04; H04W 72/0486; H04W 72/10; H04W 84/12; H04W 72/04
  USPC .......................................................... 370/329
  See application file for complete search history.

(56) References Cited

U.S. PATENT DOCUMENTS

| | | | | |
|---|---|---|---|---|
| 7,385,923 | B2* | 6/2008 | Baratakke | H04L 29/06 370/235 |
| 7,477,675 | B2* | 1/2009 | Endoh | H04L 69/16 370/235 |
| 7,697,561 | B2* | 4/2010 | Nishibayashi | H04L 1/1614 370/392 |
| 8,185,792 | B2* | 5/2012 | Suneya | H04L 1/0021 714/748 |
| 8,700,965 | B2* | 4/2014 | Park | H04L 1/1812 714/748 |
| 9,628,226 | B2* | 4/2017 | Wentink | H04L 1/1896 |
| 2002/0004838 | A1* | 1/2002 | Hakenberg | H04N 21/26216 709/231 |
| 2018/0213433 | A1* | 7/2018 | Sugaya | H04L 1/1867 |
| 2018/0293539 | A1* | 10/2018 | Tubb | G06Q 10/0833 |
| 2018/0338266 | A1* | 11/2018 | Sakai | H04W 28/065 |

FOREIGN PATENT DOCUMENTS

| | | |
|---|---|---|
| JP | 2006-279436 A | 10/2006 |
| JP | 2008-312126 A | 12/2008 |
| JP | 2013-542674 A | 11/2013 |

\* cited by examiner

| Priority | 802.11D | | 802.11e | |
|---|---|---|---|---|
| | UP (User Priority) | Name | AC (Access Category) | Name |
| Low | 1 | Background | AC_BK | Background |
| ↑ | 2 | — | AC_BK | Background |
| | 0 | Best Effort | AC_BE | Best Effort |
| | 3 | Excellent Effort | AC_BE | Best Effort |
| | 4 | Controlled Load | AC_VI | Video |
| ↓ | 5 | Video | AC_VI | Video |
| | 6 | Voice | AC_VO | Voice |
| High | 7 | Network Control | AC_VO | Voice |

FIG.3

| Sequence number of data unit | Data type | Priority |
|---|---|---|
| 1 | Voice | 1 |
| 2 | Video | 2 |
| 3 | Best Effort | 3 |
| 4 | Voice | 1 |
| 5 | Video | 2 |
| 6 | Best Effort | 3 |
| 7 | Voice | 1 |
| 8 | Video | 2 |
| 9 | Best Effort | 3 |
| 10 | Voice | 1 |
| 11 | Video | 2 |
| 12 | Best Effort | 3 |

FIG.4

| Reference priority | Priority to be covered | Sequence number of corresponding data unit |
|---|---|---|
| 1 | 1 | 1、4、7、10 |
| 2 | 1、2 | 1、2、4、5、7、8、10、11 |
| 3 | 1、2、3 | 1~12 |

FIG.5

WIRELESS COMMUNICATION APPARATUS

CROSS-REFERENCE TO RELATED APPLICATIONS

This application is a National Stage Application based on PCT/JP2017/016373, filed on 25 Apr. 2017, and claims priority to Japanese Patent Application No. 2016-134932, filed on 7 Jul. 2016, the entire contents of which being incorporated herein by reference.

TECHNICAL FIELD

The present technology relates to a wireless communication apparatus. Specifically, the present technology relates to a wireless communication apparatus that performs data exchange by using wireless communication.

BACKGROUND ART

In the past, frame aggregation to aggregate a plurality of data items into one frame and transmit the frame has been performed in order to improve the transmission efficiency in wireless communication. For example, a system to transmit/receive an A-MPDU (Aggregation MAC Protocol Data Unit) in which a plurality of MAC (Media Access Control) frames are aggregated is used. In this system, a wireless communication apparatus as a data transmission source transmits an A-MPDU, to perform transmission of a plurality of data items. Subsequently, in order to determine a data item in the plurality of transmitted data items that is not transmitted due to the occurrence of transmission errors, the wireless communication apparatus as a data transmission source further transmits a block ACK request frame. This block ACK request frame is a frame that requests delivery acknowledgement responses of all the data items previously transmitted. After reception of the block ACK request frame, a wireless communication apparatus on the data reception side returns a block ACK frame in which a plurality of delivery acknowledgements are aggregated. The wireless communication apparatus as the data transmission source receives this block ACK frame, identifies the data item that causes a transmission error, and performs retransmission. In contrast to such a system, the following system is used: an A-MPDU with information of data that requests a delivery acknowledgement response is transmitted to simplify delivery acknowledgement processing in the wireless communication apparatus on the reception side. For example, a system to transmit an A-MPDU is proposed, the A-MPDU including identification information showing the necessity of a receipt acknowledgement for each data item (see, e.g., Patent Literature 1).

CITATION LIST

Patent Literature 1: Japanese Patent Application Laid-open No. 2005-252397

DISCLOSURE OF INVENTION

Technical Problem

The conventional technology described above determines the necessity of a delivery acknowledgement for each data item on the basis of the priority of each data item, generates identification information, and adds the identification information to an A-MPDU for transmission. Thus, the delivery acknowledgement processing is omitted for data items having a low priority in the wireless communication apparatus as a transmission destination of the A-MPDU. However, when a situation of a wireless transmission path or the like changes after the A-MPDU is transmitted, a data item that requires a delivery acknowledgement return cannot be changed, and thus there arises a problem that convenience decreases.

The present technology has been created in view of such circumstances and it is an object of the present technology to improve convenience by suitably selecting a data item that requires a receipt acknowledgement response in a plurality of transmitted data items.

Solution to Problem

The present technology has been made in order to eliminate the problem described above and a first aspect thereof is a wireless communication apparatus including a control unit that controls transmission of a receipt acknowledgement request including information, the information specifying a data unit that requires a receipt acknowledgement response in a plurality of transmitted data units. This provides such an action that a data unit that requires a receipt acknowledgement response in the transmitted data is specified by the receipt acknowledgement request.

Further, in the first aspect, the control unit may generate the information according to a priority of each of the plurality of transmitted data units. This provides such art action that a data unit that requires a receipt acknowledgement response is identified according to the priority.

Further, in the first aspect, the control unit may generate the information on a basis of a reference priority, the reference priority being a reference regarding necessity of the receipt acknowledgement response. This provides such an action that a data unit that requires a receipt acknowledgement response is identified or; the basis of a reference priority.

Further, in the first aspect, the control unit may change the reference priority according to a situation of a wireless transmission path. This provides such an action that a data unit that requires a receipt acknowledgement response is; identified on the basis of a reference priority that is changed according to a situation of the wireless transmission path.

Further, in the first aspect, the control unit may change the reference priority according to an error race of the wireless transmission path. This provides such an action that a data unit that requires a receipt acknowledgement response is identified on the basis of a reference priority that is changed according to an error rate.

Further, in the first aspect, the control unit may change the reference priority when the error rate of the wireless transmission path rises. This provides such an action that a reference priority is changed when the error rate rises.

Further, in the first aspect, the control unit may change the reference priority according to a congestion degree of the wireless transmission path. This provides such an action that a data unit that requires a receipt acknowledgement response is identified on the basis of a reference priority that is changed according to a congestion degree.

Further, in the first aspect, the control unit may change the reference priority when the wireless transmission path is congested. This provides such an action that a reference priority is changed with the rise of the congestion degree.

Further, in the first aspect, the control unit may change the reference priority according to a state of a transmission buffer that holds a data unit to be transmitted. This provides such an action that a data unit that requires a receipt acknowledgement response is identified on the basis of a reference priority that is changed according to a state of a transmission buffer.

Further, in the first aspect, the control unit may change the reference priority when data units held in the transmission buffer reach a predetermined amount. This provides such an action that a data unit that requires a receipt acknowledgement return is identified on the basis of a reference priority that is changed according to the amount of data units held in the transmission buffer.

Further, in the first aspect, the control unit may generate the information according to a situation of a wireless transmission path. This provides such an action that a data unit that requires a receipt acknowledgement response is identified according to a situation of the wireless transmission path.

Further, in the first aspect, the control unit may generate, when the wireless transmission path is congested, the information in which the number of data units that require the receipt acknowledgement responses is changed. This provides such an action that the number of data units that require receipt acknowledgement responses is changed when the wireless transmission path is congested.

Further, in the first aspect, the control unit may generate the information according to a state of a transmission buffer that holds data units to be transmitted. This provides such an action that a data unit that requires a receipt acknowledgement response is identified according to a state of the transmission buffer.

Further, in the first aspect, the control unit may generate, when the data units held in the transmission buffer reach a predetermined amount, the information in which the number of data units that require the receipt acknowledgement responses is changed. This provides such an action that a data unit that requires a receipt acknowledgement response is identified according to the amount of data units held in the transmission buffer.

Further, in the first aspect, the control unit may set the data unit whose timing of output to an application in a wireless communication apparatus being a transmission destination of the plurality of data units has come as a data unit that does not require the receipt acknowledgement response, and generate the information. This provides such son action that a data unit whose; timing of output to an application in a wireless communication apparatus being a transmission destination has come is identified as a data unit that does not require the receipt acknowledgement response.

Further, in the first aspect, the control unit may determine that the timing has come by measuring an elapsed time after transmission of the plurality of data units. This provides such an action that the fact that the timing has come is determined by measuring an elapsed time after the transmission.

Further, in the first aspect, the control unit may specify the data unit the data unit being the last transmitted data unit in the data units that are consecutively transmitted, and do not require the receipt acknowledgement responses, as a data unit that does not require the receipt acknowledgement response. This provides such an action that a data unit that does not require the receipt acknowledgement response is specified by the last transmitted data unit in the data units that are consecutively transmitted and do not require the receipt acknowledgement responses.

Further, in the first aspect, the control unit may specify a data unit that requires the receipt acknowledgement response by using sequence numbers provided to the plurality of transmitted data units. This provides such an action that a data unit that requires the receipt acknowledgement response is identified by the sequence numbers.

Further, a second aspect of the present technology is a wireless communication apparatus including: a reception unit that receives a plurality of data units and a receipt acknowledgement request including information, the information specifying a data unit that requires a receipt acknowledgement response in the plurality of data units; and a control unit that controls, upon reception of a data unit other than the data unit that requires the receipt acknowledgement response based on the received receipt acknowledgement request, output of the data unit to an application. This provides such an action that a data unit other than the data unit that requires the receipt acknowledgement response is output to the application.

Further, in the second aspect, the control unit may further control transmission of a receipt acknowledgement for only the data unit in the plurality of received data units that requires the receipt acknowledgement response based on the received receipt acknowledgement request. This provides such an action that a receipt acknowledgement for the data unit that does not require the receipt acknowledgement response is not performed.

Advantageous Effects of Invention

According to the present technology, a data unit that requires a receipt acknowledgement response in a plurality of transmitted data units is suitably selected, so that an optimal effect of improving convenience may be produced. It should be noted that the effects described herein are not necessarily limited and may be any one of the effects described herein.

BRIEF DESCRIPTION OF DRAWINGS

FIG. 3 is a diagram showing an example of a priority of a data unit in the embodiment of the present technology FIG. 4 is a diagram showing sin example of the data unit for which the priority is set in the embodiment of the present technology.

FIG. 5 is a diagram showing art example of a relationship between the priority and a data unit that requires a receipt acknowledgement response in the embodiment of the present technology.

MODE(S) FOR CARRYING OUT THE INVENTION

Figure 1:
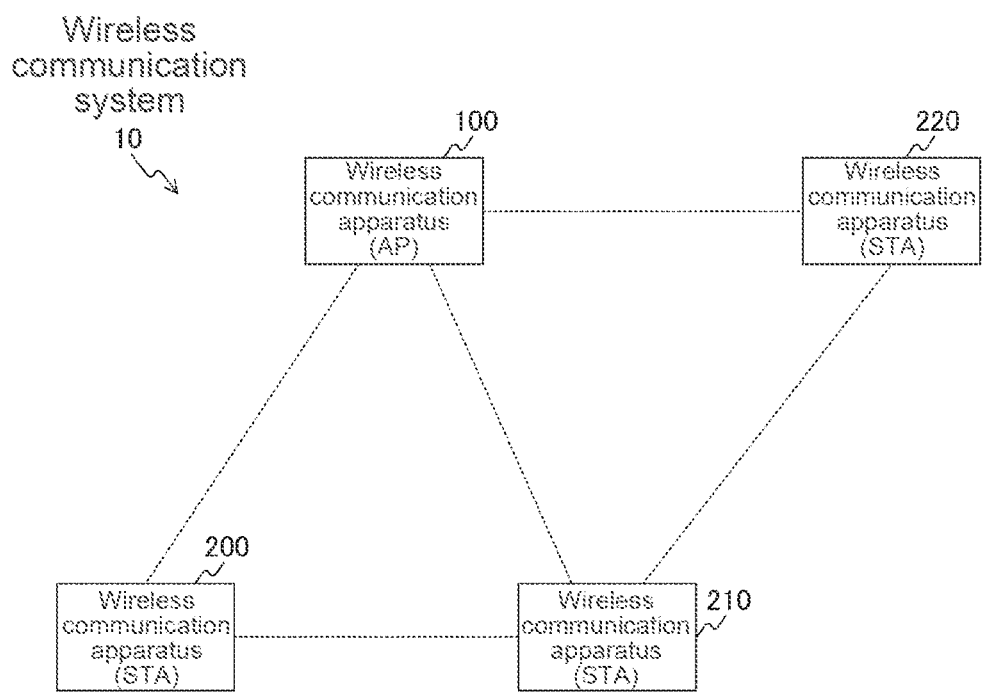
FIG. 1 is a diagram showing a configuration example of a wireless communication system 10 in an embodiment of the present technology.

Hereinafter, a mode for carrying out the present technology (hereinafter, referred to as embodiment) will be described. Description will be given in the following order.
1. Embodiment (example of transmitting block ACK request frame including information specifying data unit that requires ACK response)
2. Application Example 1. Embodiment Configuration of Wireless Communication System FIG. 1 is a diagram showing a configuration example of a wireless communication system 10 in an embodiment of the present technology. This wireless communication system 10 is a wireless network including a wireless communication apparatus (AP) 100, a wireless communication apparatus (STA) 200, a wireless communication apparatus (STA) 210, and a wireless communication apparatus (STA) 220.

For example, the wireless communication system 10 may be a network (e.g., mesh network or ad hoc network) in which a plurality of devices perform one-on-one wireless communication to thus be collected to one another.

Further, for example, the wireless communication apparatus (AP) 100 stay be an access point in a wireless LAN (Local Area Network) system. In this case, the wireless communication apparatus (STA) 200, the wireless communication apparatus (STA) 210, and the wireless communication apparatus (STA) 220 execute wireless communication under the rule of the wireless communication apparatus (AP) 100.

In FIG. 1, the apparatuses capable of directly communicating with one another using the wireless communication are connected by dotted lines. In other words, the wireless communication apparatus (AP) 100 is capable of communicating with the wireless communication apparatus (STA) 200, the wireless communication apparatus (STA) 210, and the wireless communication apparatus (STA) 220. The wireless communication apparatus (STA) 200 is capable of communicating with the wireless communication apparatus (AP) 100 and the wireless communication wireless communication apparatus (STA) 210. The wireless communication apparatus (STA) 210 is capable of communicating with the wireless communication apparatus (STA) 200, the wireless communication apparatus (AP) 100, and the wireless communication apparatus (STA) 220. The wireless communication apparatus (STA) 220 is capable of communicating with the wireless communication apparatus; (STA) 210 and the wireless communication apparatus (AP) 100.

[Configuration of Wireless Communication System]

Figure 2:
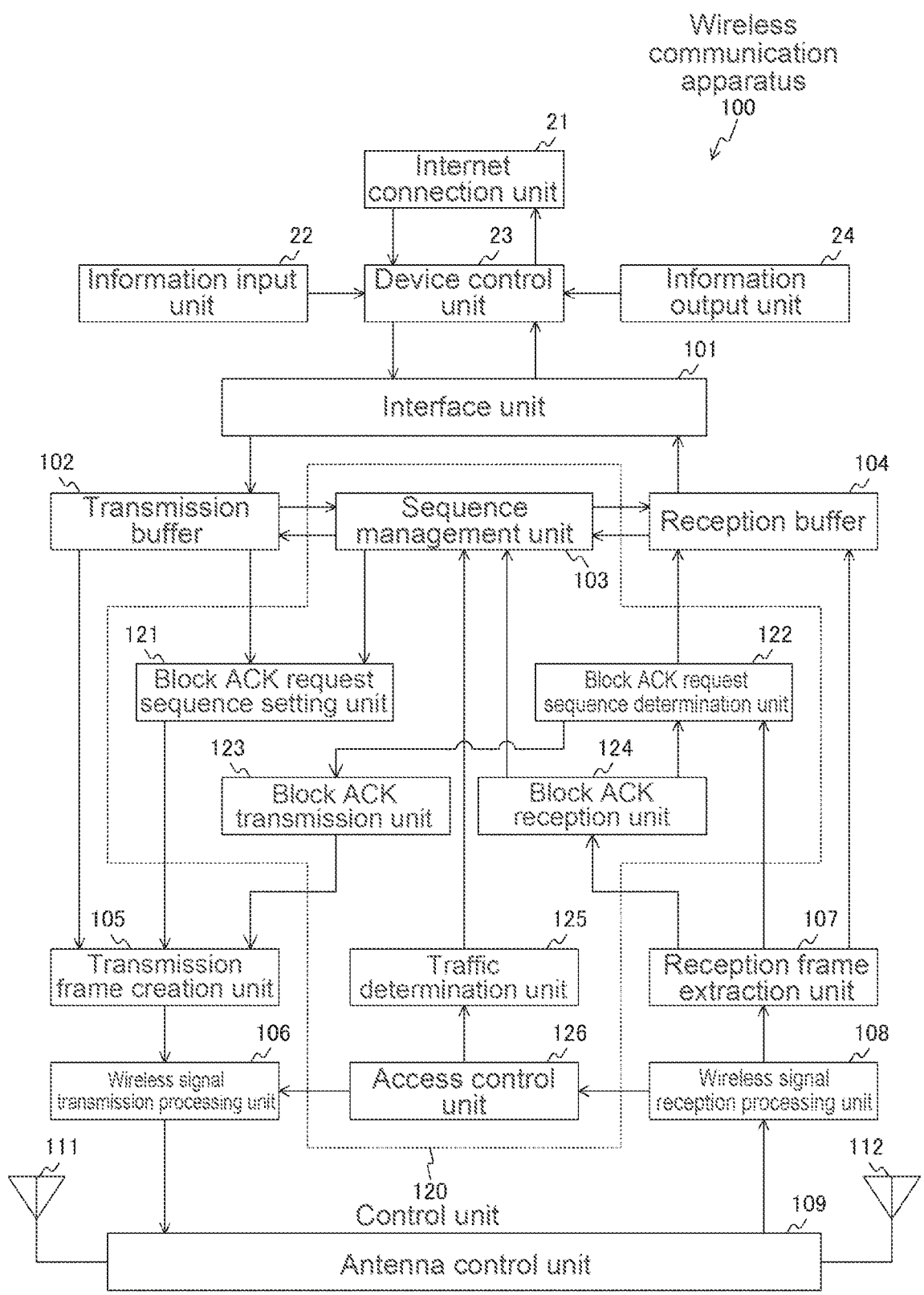
FIG. 2 is a diagram showing a configuration example of a wireless communication apparatus (AP) 100 in the embodiment of the present technology.

FIG. 2 is a diagram showing a configuration example of the wireless communication apparatus (AP) 100 in the embodiment of the present technology. It should be noted that each configuration of the wireless communication apparatus (STA) 200, the wireless communication apparatus (STA) 210, and the wireless communication apparatus (STA) 220, which have been described in FIG. 1, can be similar to the configuration of the wireless communication apparatus (AP) 100 of FIG. 1.

The wireless communication apparatus (AP) 100 includes an Internet connection unit 21, an information input unit 22, and a device control unit 23. The wireless communication apparatuses (STA) 200, 210, and 220 each include the information input unit 22, the device control unit 23, and an information output unit as needed.

The Internet connection unit 21 performs connection with the Internet.

The information input unit 22 receives an input from a user. The information input unit 22 receives an input from, for example, a keyboard or a touch panel.

The information output unit 24 outputs transmitted/received application data to the user. The information output unit 24 is capable of outputting, for example, video information or voice information as data.

The device control unit 23 controls the wireless communication apparatus (AP) 100 and the whole of the wireless communication apparatuses (STA) 200, 210, and 220. Further, the device control unit 23 includes an application for using data exchanged via the wireless communication. Examples of the application include an application for causing the information output unit 24 to display received image data. Further, the application corresponds to the application layer in a communication network and to a higher layer of a wireless communication module to be described later.

Further, each of the wireless communication apparatus (AP) 100 and the wireless communication apparatuses (STA) 200, 210, and 220 further includes an interface unit 101, a transmission buffer 102, a reception buffer 104, a transmission frame creation unit 105, and a wireless signal transmission processing unit 106. Further, each of the wireless communication apparatus (AP) 100 and the wireless communication apparatuses (STA) 200, 210, and 220 further includes a reception frame extraction unit 107, a wireless signal reception processing unit 108, an antenna control unit 109, and antenna elements 111 said 112. Each of those units can be achieved by, for example, a wireless communication module specialized for the wireless communication.

Further, each of the wireless communication apparatus (AP) 100 and the wireless communication apparatuses (STA) 200, 210, and 220 further includes a sequence management unit 103, a block ACK request sequence setting unit 121, and a block ACK request sequence determination unit 122. Further, each of the wireless communication apparatus (AP) 100 and the wireless communication apparatuses (STA) 200, 210, and 220 further includes a block ACK transmission unit 123, a block ACK reception unit 124, a traffic determination unit 125, and an access control unit 126.

Here, the sequence management unit 103, the block ACK request sequence setting unit 121, the block ACK request sequence determination unit 122, the block ACK transmission unit 123, and the block ACK reception unit 124 constitute the control unit 120. The control unit 120 further includes the traffic determination unit 125 and the access control unit 126.

The interface unit 101 is an interface that inputs data to be transmitted by wireless communication from the user and outputs data received by the wireless communication to the user. The interface unit 101 outputs data to be transmitted to the transmission buffer 102 and acquires received data from the reception buffer 104.

The transmission buffer 102 is a buffer that temporarily holds data to be transmitted to another wireless communication apparatus. The transmission buffer 102 in FIG. 2 holds data input from the device control unit 23 via the interface unit 101.

The reception buffer 104 is a buffer that temporarily holds data received from another wireless communication apparatus. The reception buffer 104 in FIG. 2 takes a data unit to be described later from a data frame and holds the data unit the data frame being output from the reception frame extraction unit 107 to be described later.

The sequence management unit 103 manages a sequence number and a priority of the data held by the transmission buffer 102. Here, the sequence number is a number provided to each data unit to be transmitted/received. Further, the data unit is a unit of data managed on the basis of the priority or the like.

Further, the sequence management unit 103 causes the transmission frame creation unit 105 to output and transmit the data unit held in the transmission buffer 102. The transmission frame creation unit 105 will be described later. The output of the data unit is performed in order of sequence number. Subsequently, the sequence management unit 103 deletes from the transmission buffer 102 a data unit that does not require a receipt acknowledgement response, which is determined by the block ACK request sequence setting unit 121 to be described later. Meanwhile, the sequence management unit 103 causes the transmission buffer 102 to continuously hold a data unit that requires a receipt acknowledgement response, which is determined by the block ACK request sequence setting unit 121, in preparation for retransmission when a transmission error occurs. When a data unit causing a transmission error is identified in the block ACK reception unit 124 to be described later, the sequence management unit 103 controls retransmission of that data unit.

Further, the sequence management unit 103 controls output of the received data to an application as a higher layer. Specifically, the sequence management unit 103 controls output of the data held in the reception buffer 104 to an application of the device control unit 23. This output is performed in order of sequence number. Among data units that fail to be received due to transmission errors, data units that require receipt acknowledgement responses are output to the application after retransmission thereof. Also in this case, the data units are output in order of sequence number. Among the data units held in the reception buffer 104, data units whose timing of output to the application has come are output to the application even in the case where the data units are not consecutive in order of sequence number. Meanwhile, in the case where data units that do not require receipt acknowledgement responses, which are identified in the block ACK request sequence determination unit 122 to be described later, are held in the reception buffer 104, the sequence management unit 103 outputs those data units before the timing described above comes. In this case, the data units can be output in order of sequence number.

The transmission frame creation unit 105 creates a frame to be transmitted on the basis of a predetermined format and outputs the frame to the wireless signal transmission processing unit 106. The transmission frame creation unit 105 creates a frame that transmits data output from the transmission buffer 102. For the frame that transmits data, an A-MPDU frame in which a plurality of data frames (MAC frames) are aggregated can be employed, in addition to the data frame.

Further, the transmission frame creation unit further creates a block ACK request frame. The block ACK request frame is a frame that requests receipt acknowledgement processing for the plurality of data units previously transmitted. The transmission frame creation unit 105 generates a block ACK request frame on the basis of information specifying a data unit that requires a receipt acknowledgement response, the information being output from the block ACK request sequence setting unit 121 to be described later. Further, the transmission frame creation unit 105 further creates a block ACK frame. The block ACK frame is a frame that collectively performs a plurality of receipt acknowledgement responses. The transmission frame creation unit 105 creates the block ACK frame on the basis of receipt acknowledgement information that is output from the block ACK transmission unit 123 to be described later. Detailed configurations of the block ACK request frame and the block ACK frame will be described later.

The wireless signal transmission processing unit 106 uses a frame to be transmitted as a baseband signal, to convert it into a high-frequency signal.

The antenna control unit 105 controls the antenna elements 111 and 112.

The antenna elements 111 and 112 transmit signals to a wireless transmission path and receives signals from the wireless transmission path.

The wireless signal reception processing unit 108 extracts the baseband signal from the high-frequency signal received via the antenna elements 111 and 112 and outputs the baseband signal to the reception frame extraction unit 107. It should be noted that the wireless signal reception processing unit 108 is an example of a reception unit described in the Claims.

The reception frame extraction unit 107 extracts frames from the baseband signal. The reception frame extraction unit 107 in FIG. 2 extracts the data frame, the block ACK request frame, and the block ACK frame and outputs those frames to the reception buffer 104, the block ACK request sequence determination unit 122, and the block ACK reception unit 124, respectively.

The block ACK request sequence setting unit 121 specifies a data unit that requires a receipt acknowledgement response in a wireless communication apparatus as a transmission destination. This specifying can be performed by, for example, specifying a sequence number of the data unit that requires a receipt acknowledgement response. The block ACK request sequence setting unit 121 generates information to specify the data unit that requires a receipt acknowledgement response, and outputs the information to the transmission frame creation unit 105. Further, the block ACK request sequence setting unit 121 is also capable of changing the number of data units that require receipt acknowledgement responses and adjusting a transmission delay. A data unit that requires a receipt acknowledgement response can be specified according to the priority of the data unit for example. In other words, for a data unit having a high priority, a receipt acknowledgement response can be requested and the retransmission of the data unit can be performed on the basis of the returned receipt acknowledgement. In contrast, for a data unit having a low priority, the request of the receipt acknowledgement response can be omitted. Further, even in the case where a response indicates that the data unit is not received in the transmission destination of the data unit retransmission processing can be omitted for a data unit having a low priority. This can improve the throughput of transmission of data units.

Further, the data unit that requires a receipt acknowledgement response can be specified according to a situation of the wireless transmission path. For example, in the case where the wireless transmission path is congested, the number of data units that request receipt acknowledgement responses can be changed. Specifically, in the case where the wireless transmission path is congested, the number of data units that request receipt acknowledgement responses can be reduced. For example, among a plurality of transmitted data units, data units early transmitted can be considered as data units that do not require receipt acknowledgement responses irrespective of the priority and can be excluded from the specified data units that require receipt acknowledgement responses. Thus, even in the case where the wireless transmission path is congested, the throughput of data transmission can be prevented from decreasing. In this case, the block ACK request sequence setting unit 121 determines a situation of the wireless transmission path on the basis of a congestion degree determined by Further, the data unit that requires a receipt acknowledgement response can be specified according to a situation of the transmission buffer 102. For example, when the data units held in the transmission buffer 102 reach a predetermined amount, the number of data units that request receipt acknowledgement responses can be changed. Specifically, when the data units; held in the transmission buffer 102 reach a predetermined amount, the number of data units that request receipt acknowledgement responses can be reduced. In this case, irrespective of the priority, the transmitted data units can be changed to data units that do not require receipt acknowledgement responses, thus omitting the processing for receipt acknowledgement and retransmission. Thus, the data units held in the transmission buffer 102 in preparation for retransmission can be deleted. It should be noted that, for the predetermined amount described above, for example, a value of 80% of a permissible data amount of the transmission buffer 102 can be set in advance for use.

Further, a data unit whose timing of output to the application in the wireless communication apparatus as a transmission destination of the data unit has come can be set us a data unit that does not require a receipt acknowledgement response. For example, in the case where the application performs display of an image based on the data received in the wireless communication apparatus as a transmission destination, a timing at which image data in this application is to be displayed can be set to a timing at which the image data is to be output to the application described above. In order to acquire this timing, a timer for measuring an elapsed time after the transmission of the data unit can be used. Thus, real-time properties in the application of the transmission destination can be improved. Further, the wireless communication apparatus as a transmission destination of the data unit can be notified of the fact that a timing of output to the application has come.

The access control unit 126 controls communication with another communication apparatus on the wireless transmission path in conformity to a predetermined communication protocol.

The traffic determination unit 125 determines the congestion degree of the wireless transmission path.

The block ACK request sequence determination unit 122 identifies data units that require receipt acknowledgement responses and data units that do not require receipt acknowledgement responses, on the basis of the received block ACK request frame.

The block ACK transmission unit 123 performs receipt acknowledgement of the data units that require receipt acknowledgement responses, the data units being identified in the block ACK request sequence determination unit 122. Further, the block ACK transmission unit 123 generates results of the receipt acknowledgement as receipt acknowledgement information and outputs the receipt acknowledgement information to the transmission frame creation unit 105.

The block ACK reception unit 124 analyzes the received block ACK frame and identifies a data unit causing a transmission error.

[Priority of Data Unit]

FIG. 3 is a diagram showing an example of the priority of the data unit in the embodiment of the present technology. As described above, in the embodiment of the present technology, it is determined whether a data unit requires a receipt acknowledgement response or not according to the priority. As shown in FIG. 3, the priority defined in the wireless LAN standard of IEEE (Institute of Electrical and Electronic Engineers) 802.11 can be applied to the above priority. In IEEE802.11D, "Network Control", "Voice", "Video", "Controlled Load", "Excellent Effort", "Best Effort", and "Background" are defined as User Priority in descending order of priority. Further, in IEEE802.11e, "Voice", "Video", "Best Effort", and "Background" are defined as Access Category in descending order of priority. Those priorities can be applied to the data units.

In such a manner, a data unit having high importance such as system control data or voice data corresponds to the data unit having a high priority. A data unit having low importance such as a background image corresponds to the data unit having a low priority. It should be noted that the priority is not limited to this example, and another index can also be used therefor.

[Priority Setting]

FIG. 4 is a diagram showing an example of a data unit for which the priority is set in the embodiment of the present technology. FIG. 4 shows a case where the priority is set for a data unit held in the transmission buffer 102 described in FIG. 2. FIG. 4 assumes a case where the priorities of three levels are set for data units. Since data units having sequence numbers 1, 4, 7, and 10 have a data type of "Voice", the priority 1 of the highest priority is set therefor. Since data units having sequence numbers 2, 5, 8, and 11 have a data type of "Video", the priority 2 of the second highest priority is set therefor. Since data units having sequence numbers 3, 6, 9, and 12 have a data type of "Best Effort", the priority 3 of the lowest priority is set therefor. It should be noted that the priority 3 can also be set for the case where the data type is "Background". This priority setting is performed by the sequence management unit 103 described in FIG. 2.

It should be noted that the priority setting is not limited to this example. For example, the priorities of four levels or more can be set for data units.

[Relationship Between Priority and Data Unit that Requires Receipt Acknowledgement Response]

FIG. 5 is a diagram showing an example of a relationship between the priority and a data unit that requires a receipt acknowledgement response in the embodiment of the present technology. FIG. 5 shows a relationship between a reference priority and a priority of a data unit that requires a receipt acknowledgement response. Here, the reference priority is a reference regarding the necessity of a receipt acknowledgement response. In FIG. 5, a data unit having a priority higher than a reference priority is assumed as a data unit that requires a receipt acknowledgement response.

Specifically, in the case where the reference priority is 1, the data unit of the priority 1 corresponds to a data unit that requires a receipt acknowledgement response. The sequence numbers of the data units corresponding thereto are 1, 4, 7, and 10. The data units having the other sequence numbers correspond to data units that do not require receipt acknowledgement responses. Those data units are not subjected to the retransmission processing. In the case where the reference priority is 2, the data units of the priorities 1 and 2 correspond to data units that require receipt acknowledgement responses. The sequence numbers of the data units corresponding thereto are 1, 2, 4, 5, 7, 8, 10, and 11. In the case where the reference priority is 3, the data units of all the priorities correspond to data units that require receipt acknowledgement responses.

The reference priority can be changed according to a situation after transmission of the data units. For example, the reference priority can be changed according to a situation of the wireless transmission path. For example, the reference priority can be changed according to an error rate of the wireless transmission path. For example, when the error rate of the wireless transmission path rises, the reference priority can be changed. Specifically, when the error rate of the wireless transmission path rises, the reference priority can be changed to a lower priority. Performing response and retransmission of the receipt acknowledgement for the data unit having a lower priority can cause more data units to reach a wireless communication apparatus on the reception side even when the error rate rises.

Further, for example, the reference priority can be changed according to the congestion degree of the wireless transmission path. For example, when the wireless transmission path is congested, the reference priority car be changed. Specifically, when the wireless transmission path is congested, the reference priority can be changed to a higher priority. Limiting data units that require the response and retransmission processing for receipt acknowledgements can prevent the throughput of data transmission from decreasing. Meanwhile, when the wireless transmission path is not congested, the reference priority can be changed to a lower priority, so that a receipt acknowledgement response can be requested for many data units.

Further, for example, the reference priority can also be changed according to a situation of the transmission buffer 102. For example, when the data units held in the transmission buffer 102 described in FIG. 2 reach a predetermined amount, the reference priority can be changed. Specifically, when the data units held in the transmission buffer 102 reach a predetermined amount, the reference priority can be changed to a higher priority. Thus, the data units held in the transmission buffer 102 in preparation for retransmission processing can be deleted.

In such a manner, the reference priority is changed when the situation of the wireless transmission path or the transmission buffer 102 is changed, so that a data unit that requires a receipt acknowledgement can be selected on the basis of the reference priority set in advance and the processing can be simplified.

[Wireless Communication Sequence]

Figure 6:
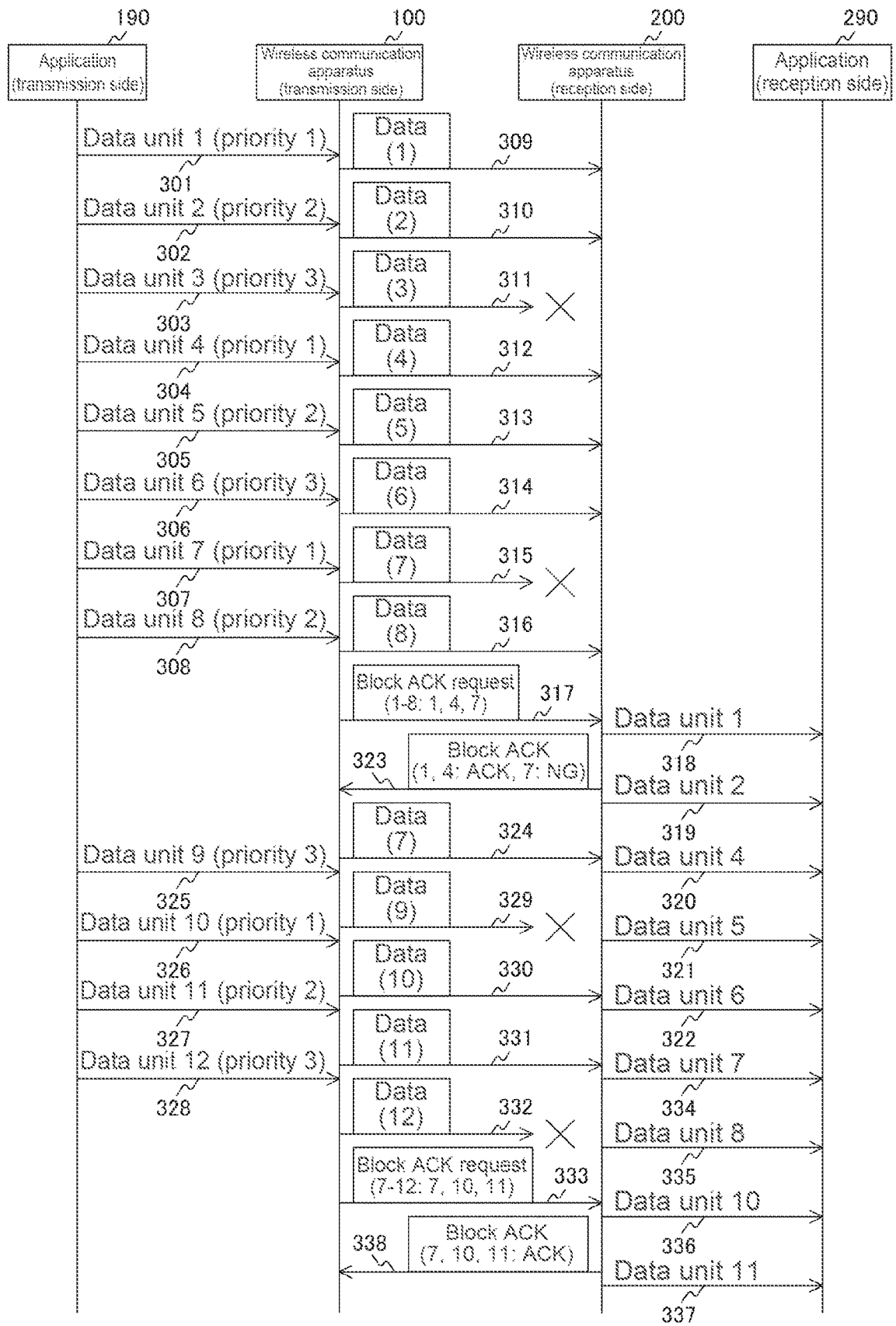
FIG. 6 is a diagram schematically showing the exchange of frames between the wireless communication apparatuses in the embodiment of the present technology.

FIG. 6 is a diagram schematically showing the exchange of frames between the wireless communication apparatuses in the embodiment of the present technology. FIG. 6 is a sequence diagram showing the exchange of data to be transmitted from the wireless communication apparatus on the transmission side (wireless communication apparatus (AP) 100) to the wireless communication apparatus on the reception side (wireless communication apparatus (STA) 200). It should be noted that the same sequence is performed also in the case where data is transmitted from the wireless communication apparatus on the transmission side (wireless communication apparatus (STA) 200 to the wireless communication apparatus on the reception side (wireless communication apparatus (AP100).

First, a data unit 1 is output from an application 190 as an application on the transmission side to the wireless communication apparatus 100 (301). Here, the "data unit 1" represents a data unit provided with the value "1" as a sequence number. Further, a "priority 1" in FIG. 6 indicates that the priority of the data unit 1 has the value "1". In such a manner, the sequence management unit 103 sequentially gives sequence numbers to date units, which are output from the application as a transmission destination, and for which the priorities are set.

Next, when the data unit 1 is output, the transmission frame creation unit 105 of the wireless communication apparatus 100 creates a data frame including the data unit 1, and the data frame is transmitted to the wireless communication apparatus 200 (309). Here, the rectangle in FIG. 6 represents a frame. Further, a frame type is given to the rectangle. For example, frames to which "data", "block ACK request", and "block ACK" are given represent a data frame, a block ACK request frame, and a block ACK frame, respectively. It should be noted that "data (1)" represents a data frame corresponding to the data unit with the sequence number of the value "1".

In a similar manner, data units 2 to 8 are sequentially output from the application 190 to the wireless communication apparatus 100 (302 to 308). Every time those data units are output, the wireless communication apparatus 100 transmits data frames (310 to 316). In FIG. 6, the following case is assumed: among the transmitted data frames, the data frames including the data units with the sequence numbers 3 and 7 do not reach the wireless communication apparatus 200 due to transmission errors.

Subsequently, the wireless communication apparatus 100 transmits a block ACK request frame (317). Here, in a "block ACK request (1 to 8: 1, 4, 7)" in FIG. 6, "1 to 8" in the parentheses represents the range of the sequence numbers of the data units that are targets for the block ACK request, and the numbers subsequent to ":" in the parentheses each represent a sequence number of a data unit that requires a receipt acknowledgement response. In other words, the block ACK request frame in FIG. 6 indicates that the data units with the sequence numbers 1 to 8 are targets for the block ACK request and that the data units with the sequence numbers 1, 4, and 7 among them are data units that require receipt acknowledgement responses. In FIG. 6, the following case is assumed: the wireless communication apparatus 100 sets 1 for the reference priority described in FIG. 5.

The wireless communication, apparatus 200, which receives the block ACK request frame, grasps the data units that require receipt acknowledgement responses among the received data units, and identifies a data unit that does not require a receipt acknowledgement response. This is performed by the block ACK request sequence determination unit 122. In FIG. 6, among the received data units, data units that do not require receipt acknowledgement responses are data units with the sequence numbers 2, 5, 6, and 8. Further, among the data units with the sequence numbers 3 and 7, which cause transmission errors, the data unit with the sequence number 3 corresponds to a data unit that does not require a receipt acknowledgement response, and the data unit with the sequence number 7 corresponds to a data unit that requires a receipt acknowledgement response. Subsequently, the wireless communication apparatus 200 outputs the data units to an application 290 in order of sequence number, the data units excluding the data unit with the sequence number 3, which is not received and does not require a receipt acknowledgement return. In other words, the data units with the sequence numbers 1, 2, and 4 to 6 are sequentially output to the application 290 (318 to 322).

Meanwhile, the wireless communication apparatus 200 transmits a block ACK frame to the wireless communication apparatus 100 (323). Here, in a "block ACK (1, 4: ACK, 7: NG)" in FIG. 6, "1, 4: ACK" in the parentheses represents the fact that the data units with the sequence numbers 1 and 4 are received, and "7: NG" in the parentheses represents the fact that the data unit with the sequence number 7 is not received. The wireless communication apparatus 100, which has received this block ACK frame, retransmits the data frame of the sequence number 7 (324). Subsequently, data units 9 to 12 are sequentially output from the application 190 to the wireless communication apparatus 100 (325 to 328). The wireless communication apparatus 100 creates data frames from those data units to transmit them (329 to 332). In FIG. 6, the following case is assumed among the transmitted data frames, the delta frames including the data units with the sequence numbers 9 and 12 do not reach the wireless communication apparatus 200 due to transmission errors.

Subsequently, the wireless communication apparatus 100 transmits a block ACK request frame (333). The block ACK request frame indicates that the data units with the sequence numbers 7 to 12 are targets for the block ACK request and that the data units with the sequence numbers 7, 10, and 11 are data units that require receipt acknowledgement responses. Since transmission errors are caused in the previous transmission of the data frames, the wireless communication apparatus 100 determines that the error rate of the wireless transmission path rises and thus changes the reference priority from 1 to 2. Thus, a receipt acknowledgement response is requested also for the data unit with the sequence number 11 (priority 2).

The wireless communication apparatus 200, which has received this frame, determines that the retransmission processing is not to be performed for the data units with the sequence numbers 9 and 12 and outputs the data units with the sequence numbers 7, 8, 10, and 11 to the application 290 (334 to 337). Further, the wireless communication apparatus 200 transmits a block ACK frame indicating the fact that the data units with the sequence numbers 7, 10, and 11 are received to the wireless communication apparatus 100 (338).

It should be noted that, in FIG. 6, a plurality of data units are transmitted as individual data frames when transmitted from the wireless communication apparatus 100, but an A-MPDU frame that aggregates the data units can be created for transmission. Further, the frame can also be transmitted by multicasting.

[Block ACK Request Frame]

Figure 7:
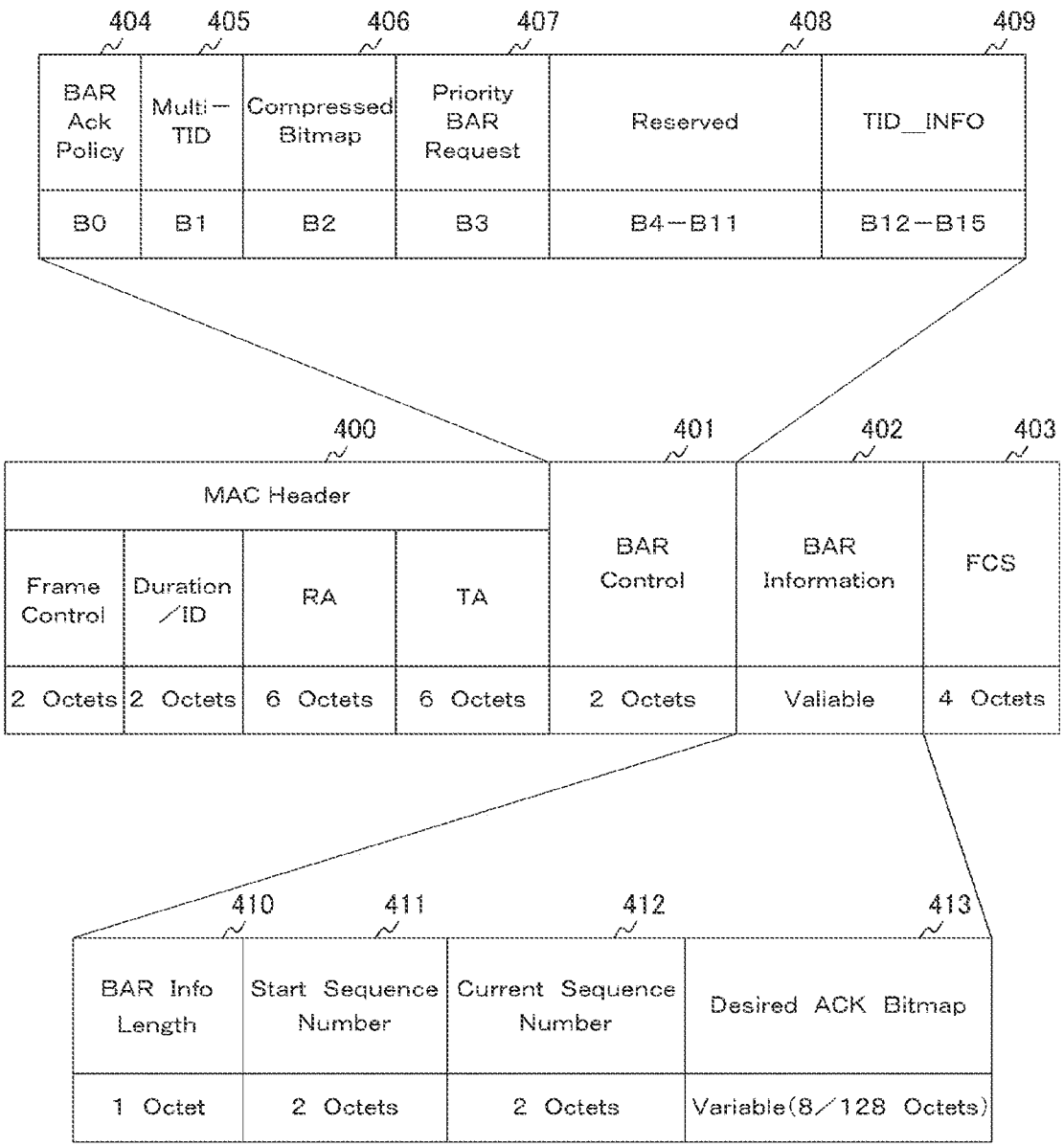
FIG. 7 is a diagram showing an example of a block ACK request frame in the embodiment of the present technology.

FIG. 7 is a diagram showing an example of the block ACK request frame in the embodiment of the present technology. The block ACK request frame in FIG. 7 includes MAC Header 400, BAR (Block Ack Request) Control 401, BAR Information 402, and FCS (Frame Check Sequence) 403. The FCS 403 is a field in which an error-detecting code is stored.

The MAC Header 400 stores an object for frame transmission and the like. The MAC Header 400 includes Frame Control, Duration/ID, RA (Receiver Address), and TA (Transmitter Address). The Frame Control stores information such as a frame type. The Duration/ID stores a duration or identifier of the frame. The RA stores the address of a reception destination of the frame. The TA stores the address of a transmission source of the frame.

The BAR Control 401 stores parameters of the block ACK request frame and the like. The BAR Control 401 in FIG. 7 stores BAR Ack Policy 404, Multi-TID 405, Compressed Bitmap 406, Priority BAR Request 407, and TID_INFO 409. Of those, the Priority BAR Request 407 stores an identifier indicating a block ACK request frame including information specifying a data unit that requires a receipt acknowledgement response. It should be noted that Reserved 408 in FIG. 7 is an unused field.

The BAR Information 402 stores information specifying a data unit that requires a receipt acknowledgement response, and the like. The BAR Information 402 in FIG. 7 stores BAR Info Length 410, Start Sequence Number 411, and Current Sequence Number 412. Further, the BAR Information 402 in FIG. 7 further stores Desired ACK Bitmap 413. The BAR Info Length 410 stores the length of the field. The Start Sequence Number 411 stores a start sequence number. The Current Sequence Number 412 stores an end sequence number. The Desired ACK Bitmap 413 stores, as data in a bitmap format, information specifying a data unit that requires a receipt acknowledgement response.

In the block ACK request frame in FIG. 7, the Start Sequence Number 411 and the Current Sequence Number 412 indicate the range of date units that are targets for the block ACK request frame. Of those, a data unit that requires a receipt acknowledgement response can be specified by changing a bit corresponding to the file stored in the Desired ACK Bitmap 413 to the value "1", for example.

[Another Example of Block ACK Request Frame]

FIG. 3 is a diagram showing another example of the block ACK request frame in the embodiment of the present technology. The block ACK request frame in FIG. 8 is a simplified one of the block ACK request frame described in FIG. 7 and is different from the block ACK request frame described in FIG. 7 in the configuration of the BAR Information 402.

Figure 8:
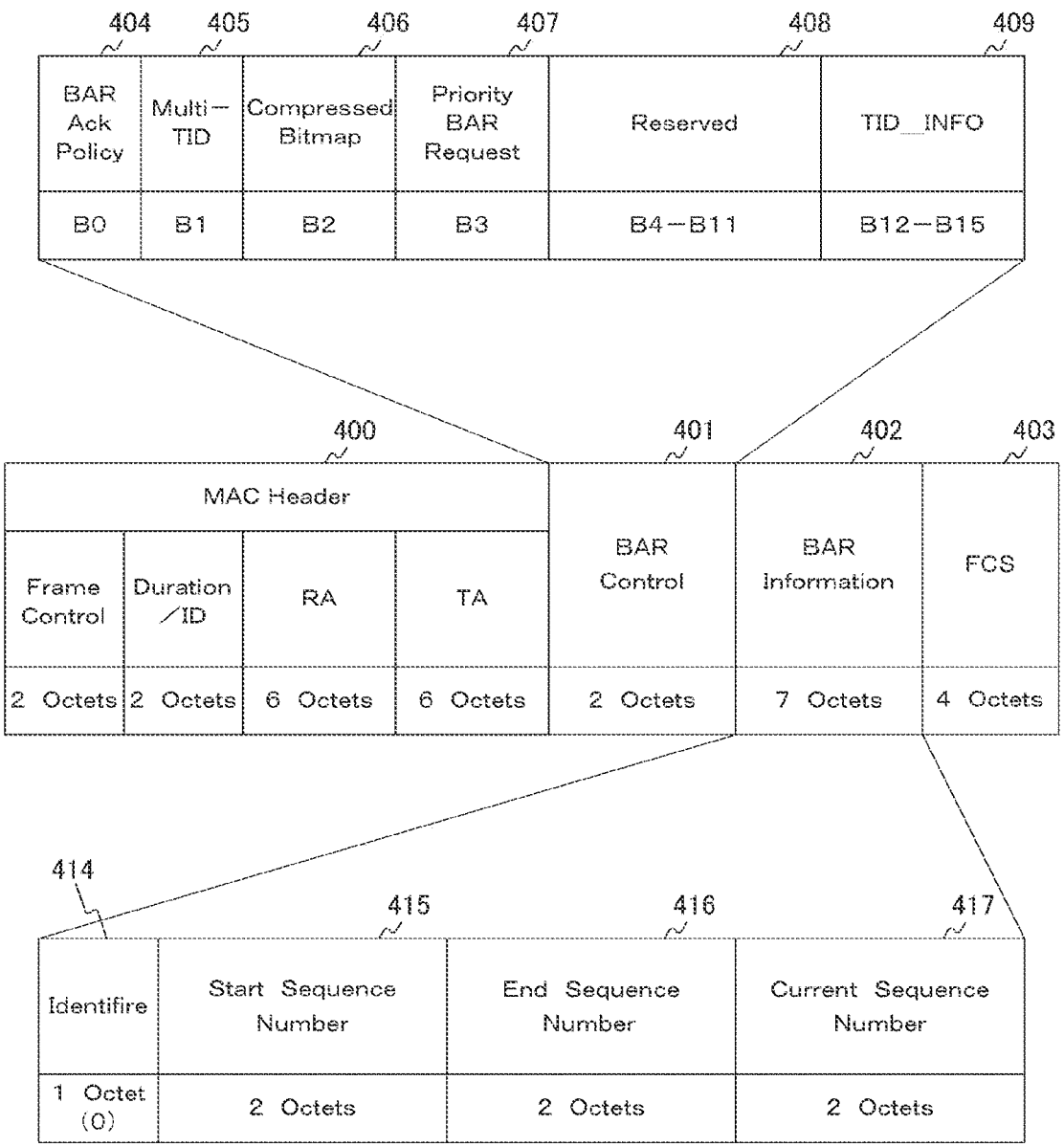
FIG. 8 is a diagram showing another example of the block ACK request frame in the embodiment of the present technology.

The BAR Information 402 in FIG. 8 stores Identifire 414, Start Sequence Number 415, and End Sequence Number 416. Further, the BAR Information 402 in FIG. 8 further stores Current Sequence Number 417. The Identifire 414 stores an identifier indicating a simplified block ACK request frame. For example, the Identifire 414 stores "0" of a 1-octet length. The Start Sequence Number 415 stores a start sequence number as with the block ACK request frame of FIG. 7. The End Sequence Number 416 stores an end sequence number of a data unit that does not require a receipt acknowledgement response. The Current Sequence Number 417 stores an end sequence number as with the block ACK request frame of FIG. 7.

Also in the block ACK request frame in FIG. 8, the Start Sequence Number 415 and the Current Sequence Number 417 indicate the range of data units that are targets for the block ACK request frame. Of those, data units that do not require receipt acknowledgement responses correspond to data units in the range indicated by the Start Sequence Number 415 and the End Sequence Number 416. In other words, among the data units as targets for the block ACK request frame, the data units up to the End Sequence Number 416 correspond to data units that do not require receipt acknowledgement responses. Meanwhile, the data units from a sequence number subsequent to the number stored in the End Sequence Number 416 to the sequence number stores in the Current Sequence Number 417 correspond to data units that require receipt acknowledgement responses.

The block ACK request frame in FIG. 8 specifies a data unit, which is the last transmitted data unit in the data units that are consecutively transmitted and do not require receipt acknowledgement responses, as a data unit that does not require a receipt acknowledgement response. The block ACK request frame in FIG. 8 can be used, for example, in the case where among a plurality of transmitted data units, data units early transmitted are collected and set as data that does not require a receipt acknowledgement response.

Other configurations are similar to those of the block ACK request frame described in FIG. 7, and description thereof will thus be omitted.

In such a manner, a bitmap file is unnecessary, and thus the block ACK frame in FIG. 8 can be easily created as compared with the block ACK request frame described in FIG. 7.

[Example of Block ACK Frame]

Figure 9:
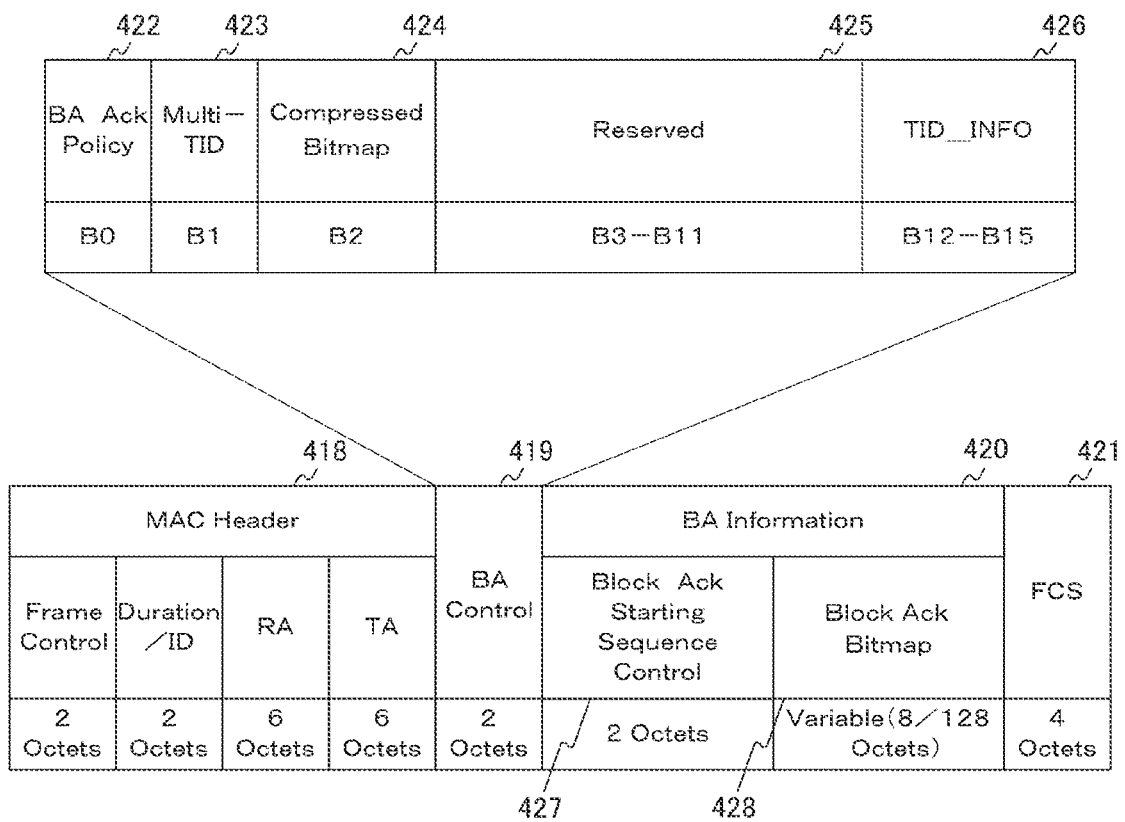
FIG. 9 is a diagram showing an example of a block ACK frame in the embodiment of the present technology.

FIG. 9 is a diagram showing an example of the block ACK frame in the embodiment of the present technology. FIG. 9 shows a configuration of the block ACK frame defined in IEEE802.11-2012. This frame includes MAC Header 418, BA (Block Ack) Control 419, BA Information 420, and FCS 421. The MAC Header 418 and the FCS 421 are respectively similar to the MAC Header 400 and the FCS 403 described in FIG. 7, and description thereof will thus be omitted.

The BA Control 419 includes BA Ack Policy 422, Multi-TID 423, Compressed Bitmap 424, Reserved 425, and TID_INFO 426.

The BA Information 420 includes Block Ack Starting Sequence Control 427 and Block Ack Bitmap 428. The Block Ack Starting Sequence Control 427 stores a start sequence number of the block ACK frame. The Block Ack Bitmap 428 stores data in a bitmap format, which shows a result of the receipt acknowledgement.

In the case where the block ACK frame in FIG. 9 is transmitted as a response to the block ACK request frame described in FIG. 8, the above-mentioned start sequence number can be caused to correspond to the sequence number of the block ACK request frame. Specifically, the number subsequent to the sequence number of the End Sequence Number 416 described in FIG. 8 can be set to the sequence number of the Block Ack Starting Sequence Control 427 described above. Thus, the stored data of the Block Ack Bitmap 428 can be shortened.

[Data Transmission Processing]

Figure 10:
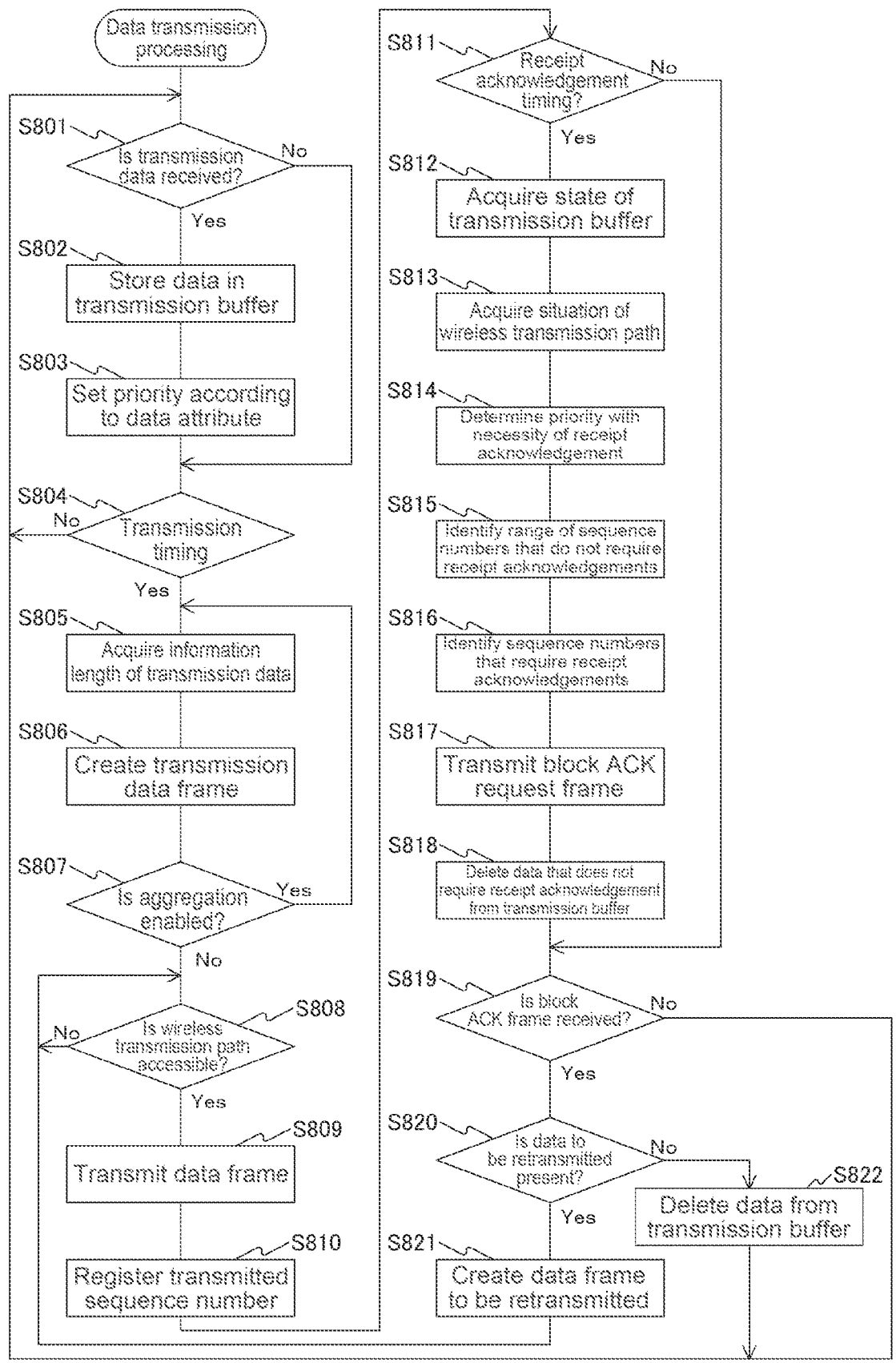
FIG. 10 is a diagram showing an example of the processing procedure of data transmission processing in the embodiment of the present technology.

FIG. 10 is a diagram showing an example of the processing procedure of data transmission processing in the embodiment of the present technology. The processing in FIG. 10 is executed every time transmission data is output from the application 190 to the wireless communication apparatus (transmission side) 100. For the purpose of convenience, the "data unit" is simply described as "data" in the description of FIG. 10 and the following figures.

First, the wireless communication apparatus 100 determines whether transmission data from the application 190 is received or not (Step S801). If the transmission data is received (Step S801: Yes), the wireless communication apparatus 100 stores data transmitted to the transmission buffer 102 (Step S802). Next, the wireless communication apparatus 100 sets the priority according to a data attribute (Step S303). Subsequently, the wireless communication apparatus 100 moves to the processing of Step S804. Meanwhile, if the transmission data is not received in Step S801 (Step S801: No), the wireless communication apparatus 100 skips the processing of Steps S802 and S803 and moves to the processing of Step S804.

In Step S804, the wireless communication apparatus 100 determines whether a transmission timing has come or not (Step S804). This can be determined on the basis of, for example, a data amount held in the transmission buffer 102. If a transmission timing has not come (Step S804: No), the wireless communication apparatus 100 executes the processing from Step S801 again. If a transmission timing has come (Step S804: Yes), the wireless communication apparatus 100 acquires the information length of the transmission data (Step S805) and creates a transmission data frame (Step S806). Next, the wireless communication apparatus 100 determines whether aggregation is enabled or not when transmitting a plurality of data frames (Step S807). For example, the wireless communication apparatus 100 is capable of determining that aggregation is disabled when a predetermined information length is exceeded by the aggregation. This can be performed on the basis of the information length acquired in Step S805. Further, for example, the wireless communication apparatus 100 is capable of determining that aggregation is disabled also in the case where data to be aggregated is absent.

As a result, if aggregation is enabled (Step S807: Yes), the wireless communication apparatus 100 executes the processing from Step S805 again. Meanwhile, if aggregation is disabled (Step S807: No), the wireless communication apparatus 100 determines whether the wireless transmission path is accessible or not (Step S808) and waits until the wireless transmission path becomes accessible. For example, the wireless communication apparatus 100 is capable of determining that the wireless transmission path is accessible when a collision with the transmission/reception of another wireless communication apparatus does not occur. If the wireless transmission path is accessible (Step S808: Yes), the wireless communicating apparatus 100 transmits the data frame (Step S809) and registers a sequence number of the transmitted data unit (Step S810). This is performed by the sequence management unit 103 described in FIG. 2.

Next, the wireless communication apparatus 100 determines whether a receipt acknowledgement timing has come or not (Step S811). For example, the wireless communication apparatus 100 is capable of determining that a receipt acknowledgement timing has come when the transmission of data with a predetermined amount is complete. If a receipt acknowledgement timing has not come (Step S811: No), the wireless communication apparatus 100 moves to the processing of Step S819. Meanwhile, if a receipt acknowledgement timing has come (Step S811: Yes), the wireless communication apparatus 100 acquires a state of the transmission buffer 102 (Step S812) and acquires a situation of the wireless transmission path (Step S813). Next, the wireless communication apparatus 100 determines the priority for which the receipt acknowledgement is to be performed on the basis of those acquired situations and the like (Step S814). Thus, the reference priority described in FIG. 5 is set.

Next, the wireless communication apparatus 100 identifies the range of sequence numbers that do not require receipt acknowledgements (Step S815), identifies sequence numbers that require receipt acknowledgements (Step S816), and creates and transmits a block ACK request frame (Step S817). Subsequently, the wireless communication apparatus 100 deletes data that does not require a receipt acknowledgement from the transmission buffer 102 (Step S818). Subsequently, the wireless communication apparatus 100 moves to the processing of Step S819.

In Step S819, the wireless communication apparatus 100 determines whether the block ACK frame is received or not (Step S819). If the block ACK frame is not received (Step S819: No), the wireless communication apparatus 100 executes the processing from Step S801 again. If the block ACK frame is received (Step S819: Yes), the wireless communication apparatus 100 determines whether data to be retransmitted is present or not (Step S820). This can be determined on the basis of a result of the receipt acknowledgement that is stored in the received block ACK frame. If data to be retransmitted is absent (Step S820: No), that is, if all data that require receipt acknowledgements are received, the wireless communication apparatus 100 deletes the data from the transmission buffer 102 (Step S822). Subsequently, the wireless communication apparatus 100 executes the processing from Step S801 again.

In Step S820, if data to be retransmitted is present (Step S820: Yes), the wireless communication apparatus 100 creates a data frame to be retransmitted (Step S821). Next, the wireless communication apparatus 100 moves to the processing of Step S808.

It should be noted that the processing of Step S817 is an example of a transmission procedure described in the Claims.

[Data Reception Processing]

Figure 11:
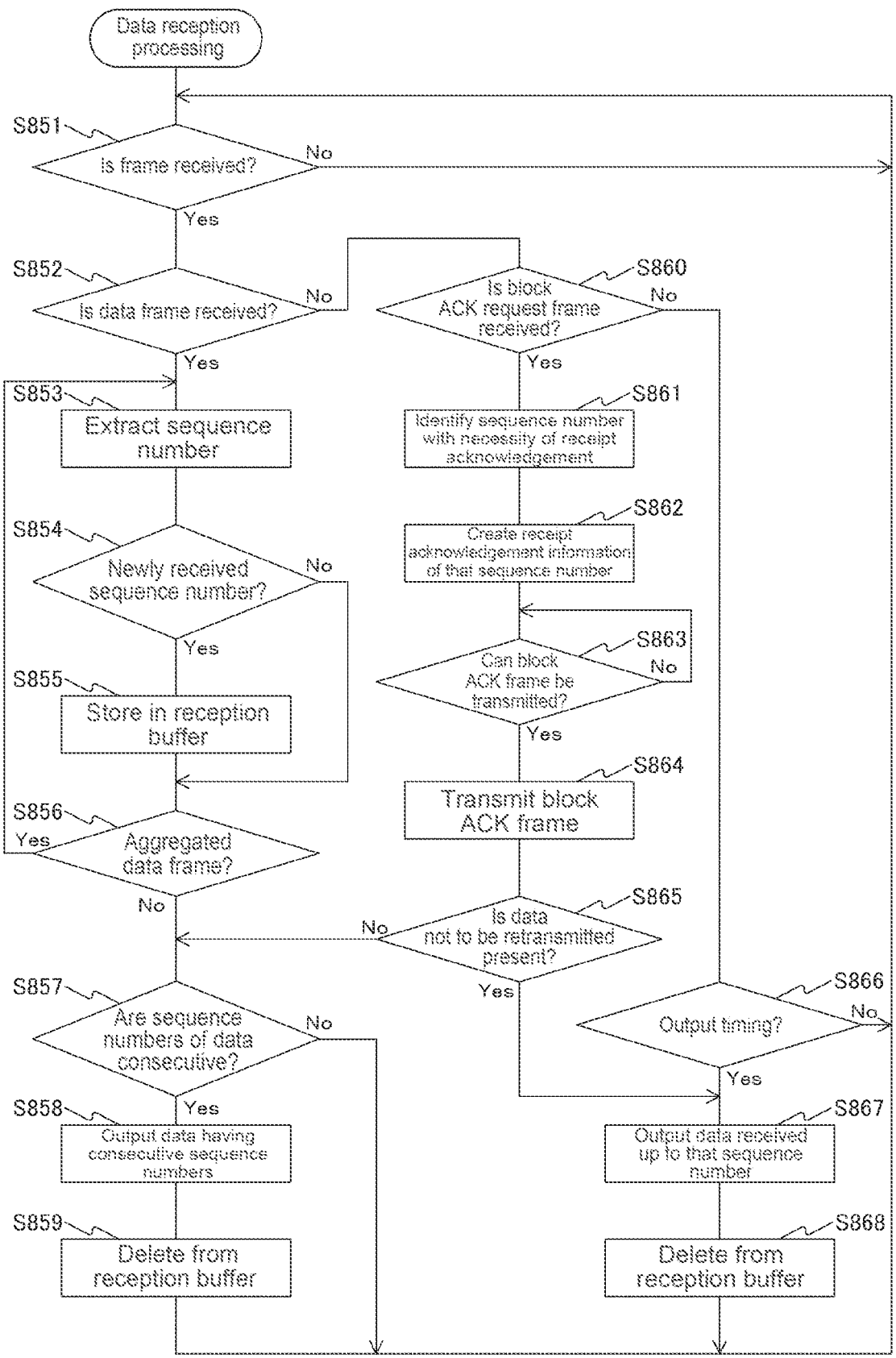
FIG. 11 is a diagram showing an example of the processing procedure of data reception processing in the embodiment of the present technology.

FIG. 11 is a diagram showing an example of the processing procedure of data reception processing in the embodiment of the present technology. The processing in FIG. 11 shows reception processing in the wireless communication apparatus (on the reception side) 200.

First, the wireless communication apparatus 200 waits until a frame is received (Step S851). If a frame is received (Step S851: Yes), the wireless communication apparatus 200 determines whether a data frame is received or not (Step S852). If a data frame is received without errors (Step S852: Yes), the wireless communication apparatus 200 extracts a sequence number (Step S853). This can be performed by extracting a sequence number stored in the MAC header of the received data frame.

Next, the wireless communication apparatus 200 determines whether the extracted sequence number is a newly received sequence number or not (Step S854). If the extracted sequence number is a newly received sequence number (Step S854: Yes), the wireless communication apparatus 200 stores the received data in the reception buffer 104 (Step S855) and moves to the processing of Step S856. Meanwhile, if the extracted sequence number is not a newly received sequence number (Step S854: No), the wireless communication apparatus 200 skips the processing of Step S855 and moves to the processing of Step S856.

In Step S856, the wireless communication apparatus 200 determines whether the received data frame is an aggregated data frame or not (Step S856). If the received data frame is an aggregated data frame (Step S856: Yes), the wireless communication apparatus 200 executes the processing from Step S853 again. If the received data frame is not an aggregated data frame (Step S856: No), the wireless communication apparatus 200 determines whether the sequence numbers of the data are consecutive or not (Step S857).

If the sequence numbers of the data are consecutive (Step S857: Yes), the wireless communication apparatus 200 outputs the data having those consecutive sequence numbers to the application 290 (Step S858). Subsequently, the wireless communication apparatus 200 deletes the data output to the application 290 from the reception buffer 104 (Step S859) and executes the processing from Step S851 again. Meanwhile, if the sequence numbers of the data are not consecutive in Step S857, the wireless communication apparatus 200 skips the processing of Steps S858 and S859 and moves to the processing of Step S851.

If the data frame is not received in Step S852 (Step S852: No), the wireless communication apparatus 200 determines whether a block ACK request frame is received or not (Step S860). If a block ACK request frame is received (Step S860: Yes), the wireless communication apparatus 200 identifies a sequence number for which the receipt acknowledgement is to be performed (Step S861). Next, the wireless communication apparatus 200 creates receipt acknowledgement information of the identified sequence number (Step S862). Next, the wireless communication apparatus 200 waits until a block ACK frame can be transmitted (Step S863). If a block ACK frame can be transmitted (Step S863: Yes), the wireless communication apparatus 200 transmits the block ACK frame (Step S864).

Next, the wireless communication apparatus 200 determines whether data not to be retransmitted is present or not (Step S865). This can be determined by identifying data that does not require a receipt acknowledgement response on the basis of the data for which the receipt acknowledgement is to be performed, which is identified in Step S861, and then determining whether such data is received or not. If data not to be retransmitted is absent, that is, if data that does not require a receipt acknowledgement response is absent (Step S865: No), the wireless communication apparatus 200 moves to the processing of Step S857. Meanwhile, if data, not to be retransmitted, that is, data that does not require a receipt acknowledgement response is present (Step S865: Yes), the wireless communication apparatus 200 outputs the data received up to that sequence number to the application 290 (Step S867). Subsequently, the wireless communication apparatus 200 deletes the data output to the application 290 from the reception buffer 104 (Step S868) and executes the processing from Step S851 again.

Meanwhile, if a block ACK request frame is not received in Step S860 (Step S860: No), whether a timing to output the received data to the application 290 has come or not is determined (Step S866). This is determined by the sequence management unit 103 described in FIG. 2. If a timing to output the received data to the application 290 has not come (Step S866: No), the wireless communication apparatus 200 executes the processing from Step S851 again. Meanwhile, if a timing to output the received data to the application 290 has come (Step S866: Yes), the wireless communication apparatus 200 moves to the processing in Step S867.

It should be noted that the processing of Steps S852 and S860 is an example of a reception procedure described in the Claims. The processing of Step S867 is an example of an output procedure described in the Claims.

In such a manner, according to the embodiment of the present technology, the convenience can be improved by suitably selecting a data unit that requires a receipt acknowledgement and notifying a transmission destination of the data unit according to at change in situation of the wireless transmission path or the like.

2. Application Example

The technology according to the present disclosure is applicable to various products. For example, the wireless communication apparatus (STA) 200 may be achieved as mobile terminals such as a smartphone, a tablet PC (Personal Computer), a laptop PC, a portable game terminal, and a digital camera, fixed terminals such as a television receiver, printer, a digital scanner, and a network storage, or in-vehicle terminals such as a car navigation apparatus. Further, the wireless communication apparatus (STA) 200 may be achieved as terminals that perform M2M (Machine To Machine) communication (also referred to as MTC (Machine Type Communication) terminals), such as a smart meter, an automatic vending machine, a remote monitoring apparatus, and POS (Point Of Sale) terminals. Furthermore, the wireless communication apparatus (STA) 200 may be a wireless communication module (e.g., an integrated circuit module constituted by a single die) to be mounted onto those terminals.

Meanwhile, for example, the wireless communication apparatus (AP) 100 may be achieved, as a wireless LAN access point (also referred to as wireless base station) with a router function, or without router function. Further, the wireless communication apparatus (AP) 100 may be achieved as a mobile wireless LAN router. Furthermore, the wireless communication apparatus (AP) 100 may be achieved as a wireless communication module (e.g., an integrated circuit module constituted by a single die) to be mounted onto those apparatuses.

2-1. First Application Example

Figure 12:
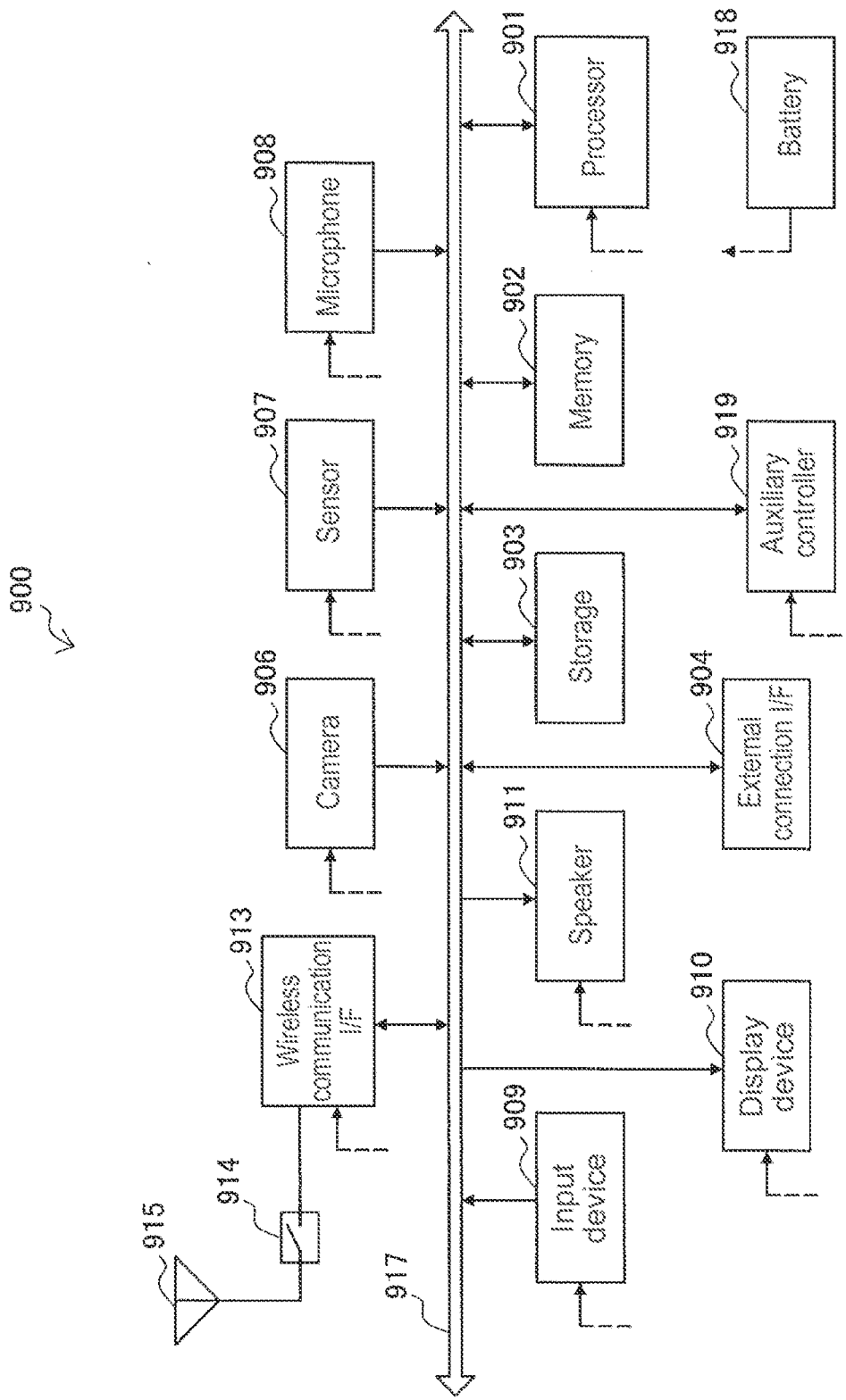
FIG. 12 is a block diagram showing an example of a schematic configuration of a smartphone 900 to which the technology according to the present disclosure is applicable.

FIG. 12 is a block diagram showing an example of a schematic configuration of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing unit) or a SoC (System on Chip) and controls the functions of the application layer or other layers of the smartphone 900. The memory 902 includes a RAM (Random Access Memory) and a ROM (Read Only Memory) and stores programs and data to be executed by the processor 901. The storage 903 may include a storage medium such as a semiconductor memory or a hard disk. The external connection interface 904 is an interface for connecting an external device such as a memory card or a USB (Universal Serial Bus) device to the smartphone 900.

The camera 906 includes, for example, an imaging device such as a CCD (Charge Coupled Device) or a CMOS (Complementary Metal Oxide Semiconductor) and generates a captured image. The sensor 907 may include, for example, a sensor group including a positioning sensor, a gyro sensor, a geomagnetic sensor, an acceleration sensor, and the like. The microphone 908 converts sound input to the smartphone 900 into a sound signal. The input device 909 includes, for example, a touch sensor that detects a touch on the screen of the display device 910, a key pad, a keyboard, a button, a switch, or the like and receives an operation of a user or an input of information. The display device 910 includes a screen of a liquid crystal display (LCD), an organic light-emitting diode (OLED) display, or the like and displays an output image of the smartphone 900. The speaker 911 converts a sound signal output from the smartphone 900 into sound.

The wireless communication interface 913 supports one or more wireless LAN standards such as IEEE802.11a, 11b, 11g, 11n, 11ac, and 11ad and executes wireless communication. The wireless communication interface 913 may communicate with another apparatus via a wireless LAN access point in an infrastructure mode. Further, the wireless communication interface 913 may directly communicate with another apparatus in a direct communication mode such as an ad hoc mode or Wi-Fi Direct. If should be noted that one of two terminals operates as an access point in the Wi-Fi Direct, unlike the ad hoc mode, but the communication is directly performed between those terminals. Typically, the wireless communication interface 913 may include a baseband processor, an RF (Radio Frequency) circuit, a power amplifier, and the like. The wireless communication interface 913 may be a memory that stores a communication control program, a processor that executes the program, or a one-chip module that integrates related circuits. The wireless communication interface 913 may support, in addition to the wireless LAN system, other types of wireless communication systems such as a near field wireless communication system, a close proximity wireless communication system, and a cellular communication system. The antenna switch 914 switches a connection destination of the antenna 915 between a plurality of circuits (e.g., circuits for different wireless communication systems) included in the wireless communication interface 913. The antenna 915 includes a single or a plurality of antenna elements (e.g., a plurality of antenna elements constituting MIMO antenna) and is used for the wireless communication interface 913 to transmit and receive a wireless signal.

It should be noted that the smartphone 900 is not limited to the example of FIG. 12 and may include a plurality of antennas (e.g., antenna for wireless LAN or antenna for close proximity wireless communication system). In such a case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies power to each block of the smartphone 900 shown in FIG. 12 via feed lines partially shown by broker lines in the figure. The auxiliary controller 919 operates the bare minimum of functions of the smartphone 900 in a sleep mode, for example.

In the smartphone 900 shown in FIG. 12, the control unit 120 described with reference to FIG. 2 may be implemented in the wireless communication interface 913. Further, at least part of those functions may be implemented in the processor 901 or auxiliary controller 919. For example, when the smartphone 900 transmits the block ACK request frame described in FIGS. 7 and 8, the retransmission processing for a data unit that does not require a receipt acknowledgement return can be eliminated, and power consumption of the battery 918 can be reduced. Further, when a data unit that requires a receipt acknowledgement is suitably selected and a transmission destination is notified of the data unit according to a change in situation of the wireless transmission path or the like, the convenience can be improved.

It should be noted, that the smartphone 900 may operate as a wireless access point (software AP) when the processor 901 executes the access point function at the application level. Further, the wireless communication interface 913 may have a wireless access point function.

2-2. Second Application Example

Figure 13:
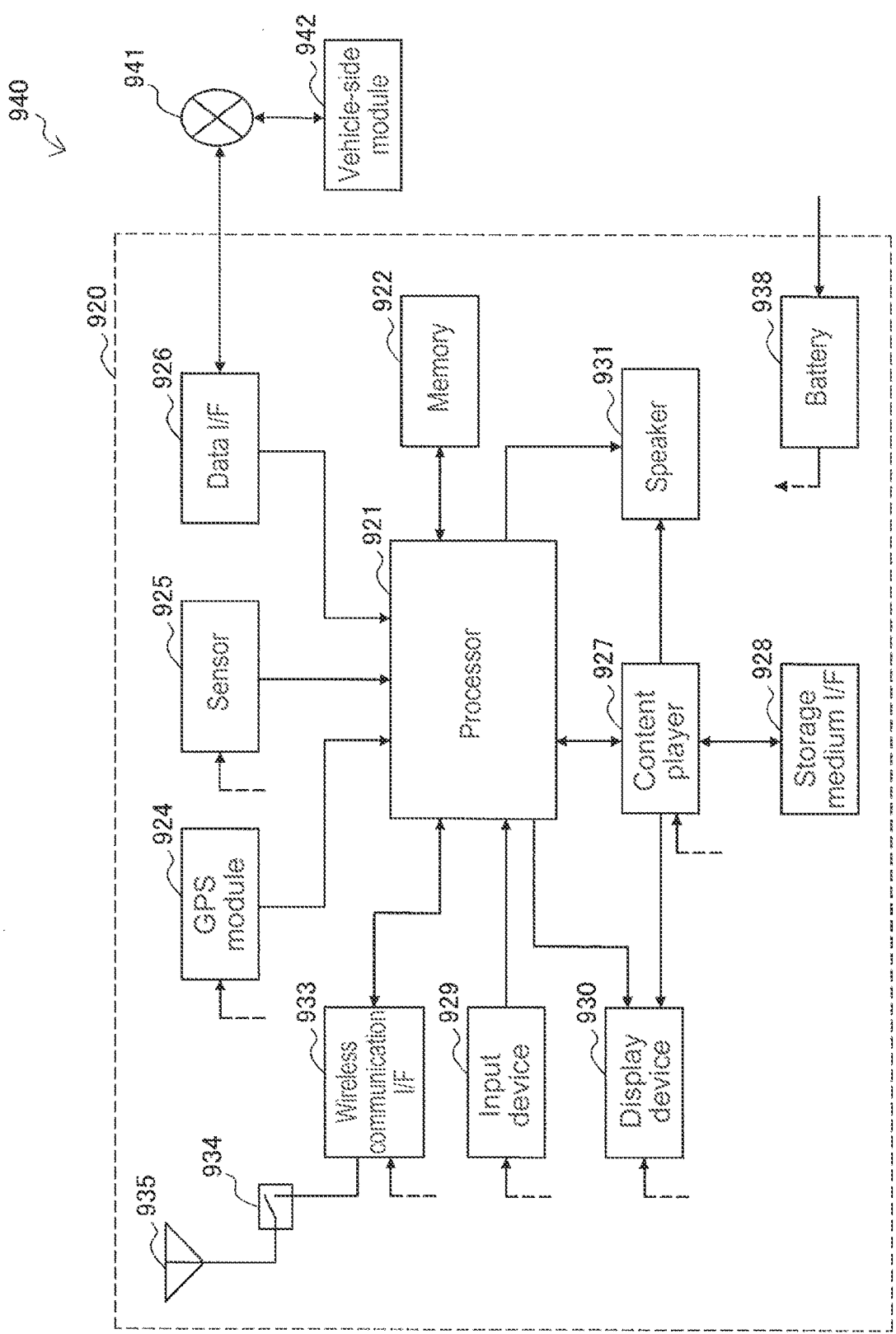
FIG. 13 is a block diagram showing an example of a schematic configuration of a car navigation apparatus 920 to which the technology according to the present disclosure is applicable.

FIG. 13 is a block diagram showing an example of a schematic configuration of a car navigation apparatus 920 to which the technology according to the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC and controls a navigation function and other functions of the car navigation apparatus 920. The memory 922 includes a RAM and a ROM and stores programs and data to be executed by the processor 921.

The GPS module 924 measures a position of the car navigation apparatus 920 (e.g., latitude, longitude, and altitude) by using a GPS signal received from a GPS satellite. The sensor 925 may include, for example, a sensor group including a gyro sensor, a geomagnetic sensor, and a pneumatic sensor, and the like. For example, the data interface 926 is connected to an in-vehicle network 941 via a terminal (not shown) and acquires data generated on the vehicle side, such as vehicle speed data.

The content player 927 reproduces the content stored in a storage medium (e.g., CD or DVD) to be inserted in the storage medium interface 928. The input device 929 includes, for example, a touch sensor that detects a touch on the screen of the display device 930, a button, a switch, or the like and receives an operation of a user or an input of information. The display device 930 includes a screen of an LCD, an OLED display, or the like and displays an image of a navigation function or content to be reproduced. The speaker 931 outputs sound of the navigation function or the content to be reproduced.

The wireless communication interface 933 supports one or more wireless LAN standards such as IEEE802.11a, 11b, 11g, 11n, 11ac, and 11ad and executes wireless communication. The wireless communication interface 933 may communicate with another apparatus via a wireless LAN access point in an infrastructure mode. Further, the wireless communication interface 933 may directly communicate with another apparatus in a direct communication mode such as an ad hoc mode or Wi-Fi Direct. Typically, the wireless communication interface 933 may include a baseband processor, an RF circuit, a power amplifier, and the like. The wireless communication interface 933 may be a memory that stores a communication control program, a processor that executes the program, or a one-chip module that integrates related circuits. The wireless communication interface 933 may support, in addition to the wireless LAN system, other types of wireless communication systems such as a near field wireless communication system, a close proximity wireless communication system, or a cellular communication system. The antenna switch 934 switches a connection destination of the antenna 935 between a plurality of circuits included in the wireless communication interface 933. The antenna 935 includes a single or a plurality of antenna elements and is used for the wireless communication interface 933 to transmit and receive a wireless signal.

It should be noted that the car navigation apparatus 920 is not limited to the example of FIG. 13 and may include a plurality of antennas. In such a case, the antenna switch 934 may be omitted from the configuration of the car navigation apparatus 920.

The battery 938 supplies power to each block of the car navigation apparatus 920 shown in FIG. 13 via feed lines partially shown by broken lines in the figure. Further, the battery 938 accumulates the power fed from the vehicle side.

In the car navigation apparatus 920 shown in FIG. 13, the control unit 120 described with reference to FIG. 2 may be implemented in the wireless communication interface 933. Further, at least part of those functions may be implemented in the processor 921. For example, when the car navigation apparatus 920 transmits the block ACK request frame described in FIGS. 7 and 8, a data unit that requires a receipt acknowledgement can be suitably selected and a transmission destination can be notified of the data unit according to a change in situation of the wireless transmission path or the like. Thus, the convenience can be improved.

Further, the wireless communication interface 933 may operate as the above-mentioned wireless communication apparatus (AP) 100 and provide wireless connection to a terminal carried by the user of the vehicle.

Further, the technology according to the present disclosure may be achieved as an in-vehicle system (or vehicle) 940 including one or more blocks of the above-mentioned car navigation apparatus 920, the in-vehicle network 941, and a vehicle-side module 942. The vehicle-side module 942 generates vehicle-side data such as a vehicle speed, an engine r.p.m., or failure information and outputs the generated data to the in-vehicle network 941.

2-3. Third Application Example

Figure 14:
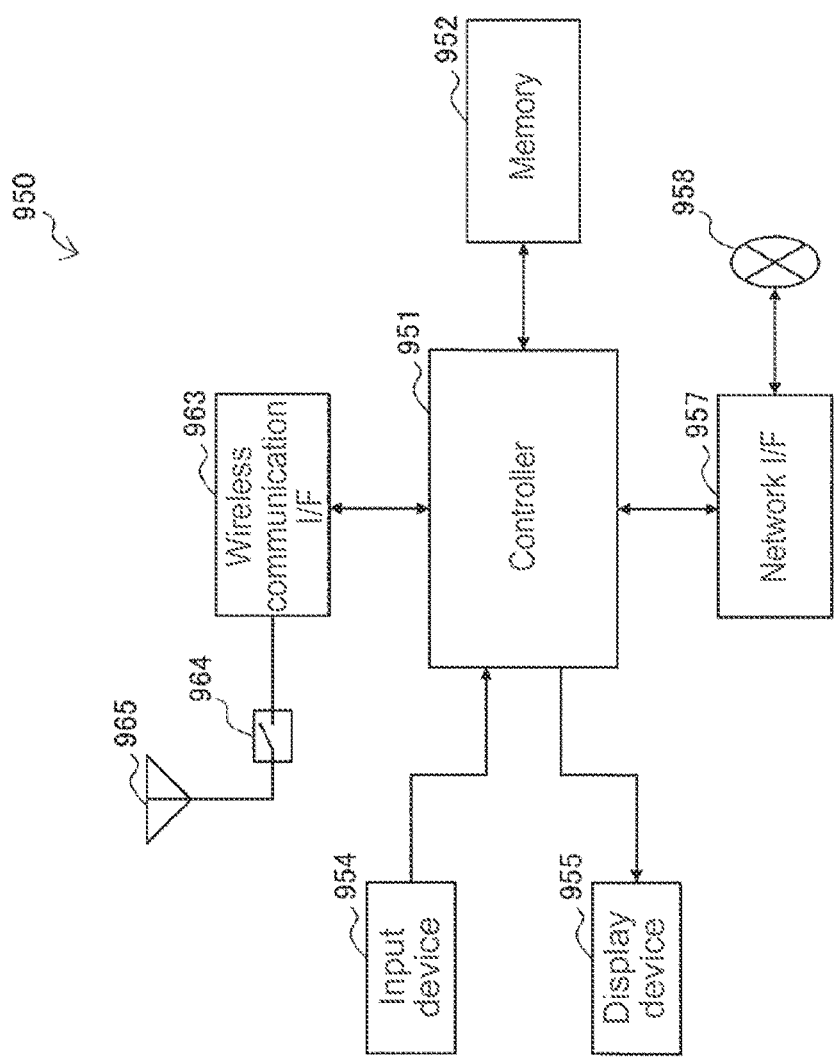
FIG. 14 is a block diagram showing an example of a schematic configuration of a wireless access point 950 to which the technology according to the present disclosure is applicable.

FIG. 14 is a block diagram showing an example of a schematic configuration of a wireless access point 950 to which the technology according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a DSP (Digital Signal Processor) and operates various functions (e.g., access restriction, routing, encryption, firewall, and log management) of higher-order layers than the IP (Internet Protocol) layer of the wireless access point 950. The memory 952 includes a RAM and a ROM and stores programs to be executed by the controller 951 and various types of control data (e.g., terminal list, routing table, encryption key, security setting, and log).

The input device 954 includes, for example, a button or a switch and receives an operation of a user. The display device 955 includes an LED lamp or the like and displays an operation status of the wireless access point 950.

The network interface 957 is a wired communication interface for the wireless access point 950 to be connected to a wired communication network 958. The network interface 957 may include a plurality of connection terminals. The wired communication network 958 may be a LAN such as Ethernet (registered trademark) or may be a WAN (Wide Area Network).

The wireless communication interface 963 supports one or more wireless LAN standards such as IEEE802.11a, 11b, 11g, 11n, 11ac, and 11ad and provides wireless connection to a near terminal to serve as an access point. Typically, the wireless communication interface 963 may include a baseband processor, an RF circuit, a power amplifier, and the like. The wireless communication interface 963 may be a memory that stores a communication control program, a processor that executes the program, or a one-chip module that integrates related circuits. The antenna switch 964 switches a connection destination of the antenna 965 between a plurality of circuits included in the wireless communication interface 963. The antenna 965 includes a single or a plurality of antenna elements and is used for the wireless communication interface 963 to transmit and receive a wireless signal.

In the wireless access point 950 shown in FIG. 14, the control unit 120 described with reference to FIG. 2 may be implemented in the wireless communication interface 963. Further, at least part of those functions may be implemented in the controller 951. For example, when the wireless access point 950 transmits the block ACK request frame described in FIGS. 7 and 8, a data unit that requires a receipt acknowledgement can be suitably selected and a transmission destination can be notified of the data unit according to a change in situation of the wireless transmission path or the like. Thus, the convenience can be improved.

It should be noted, that the embodiment described above is an example for embodying the present technology and that matters in the embodiment and matters specifying the invention in the Claims have respective correspondence relationships. In a similar manner, the matters specifying the invention in the Claims and matters in the embodiments of the present technology, which are denoted by the same names as the matters specifying the invention, have respective correspondence relationships. However, the present technology is not limited to the embodiment and can be embodied by variously modifying the embodiment without departing from the gist of the present technology.

Further, the processing procedures described in the above embodiment may be understood as a method including a series of those procedures. Alternatively, the processing procedures described in the above embodiment may be understood as a program for causing a computer to execute the series of procedures or as a recording medium storing that program. As the recording medium, for example, a CD (Compact Disc), an MD (Mini Disc), a DVD (Digital Versatile Disc), a memory card, a Blu-ray (registered trademark) Disc, and the like may be used.

It should be noted that the effects described in this specification are merely illustrative and are not restrictive, and additional effects may be provided.

It should be noted that the present technology can also have the following configurations.

(1) A wireless communication apparatus, including
a control unit that controls transmission of a receipt acknowledgement request including information, the information specifying a data unit that requires a receipt acknowledgement response in a plurality of transmitted data units.
(2) The wireless communication apparatus according to (1), in which
the control unit generates the information according to a priority of each of the plurality of transmitted data units.
(3) The wireless communication apparatus according to (2), in which
the control unit generates the information on a basis of a reference priority, the reference priority being a reference regarding necessity of the receipt acknowledgement response.
(4) The wireless communication apparatus according to (3), in which
the control unit changes the reference priority according to a situation of a wireless transmission path.
(5) The wireless communication apparatus according to (4), in which
the control unit changes the reference priority according to an error rate of the wireless transmission path.
(6) The wireless communication apparatus according to (5), in which
the control unit changes the reference priority when the error rate of the wireless transmission path rises.
(7) The wireless communication apparatus according to (4), in which
the control unit changes the reference priority according to a congestion degree of the wireless transmission path.
(8) The wireless communication apparatus according to (7), in which
the control unit changes the reference priority when the wireless transmission path is congested.
(9) The wireless communication apparatus according to (3), in which
the control unit changes the reference priority according to a state of a transmission buffer that holds a data unit to be transmitted.
(10) The wireless communication apparatus according to (9), in which
the control unit changes the reference priority when data units held in the transmission buffer reach a predetermined amount.
(11) The wireless communication apparatus according to (1), in which
the control unit generates the information according to a situation of a wireless transmission path.
(12) The wireless communication apparatus according to (11), in which
the control unit generates, when the wireless transmission path is congested, the information in which the number of data units that require the receipt acknowledgement responses is changed.
(13) The wireless communication apparatus according to (1), in which
the control unit generates the information according to a state of a transmission buffer that holds data units to be transmitted.
(14) The wireless communication apparatus according to (13), in which
the control unit generates, when the data units held in the transmission buffer reach a predetermined amount, the information in which the number of data units that require the receipt acknowledgement responses is changed.
(15) The wireless communication apparatus according to any one of (1) to (14), in which
the control unit sets the data unit whose timing of output to an application in a wireless communication apparatus being a transmission destination of the plurality of data units has come as a data unit that does not require the receipt acknowledgement response, and generates the information.
(16) The wireless communication apparatus according to (15), in which
the control unit determines that the timing has come by measuring an elapsed time after transmission of the plurality of data units.
(17) The wireless communication apparatus according to any one of (1) to (16), in which
the control unit specifies the data unit the data unit being the last transmitted data unit in the data units that are consecutively transmitted and do not require the receipt acknowledgement responses, as a data unit that does not require the receipt acknowledgement response.
(18) The wireless communication apparatus according to (17), in which
the control unit specifies a data unit that requires the receipt acknowledgement response by using sequence numbers provided to the plurality of transmitted data units.

(19) A wireless communication apparatus, including:
a reception unit that receives a plurality of data units and a receipt acknowledgement request including information, the information specifying a data unit that requires a receipt acknowledgement response in the plurality of data units; and
a control unit that controls, upon reception of a data unit other than the data unit that requires the receipt acknowledgement response based on the received receipt acknowledgement request, output of the data unit to an application.
(20) The wireless communication apparatus according to (19), in which
the control unit further controls transmission of a receipt acknowledgement for only the date unit in the plurality of received data units that requires the receipt acknowledgement response based on the received receipt acknowledgement request.

REFERENCE SIGNS LIST 10 wireless communication system
21 Internet connection unit
22 information input unit
23 device control unit
24 information output unit
190, 200, 210, 220 wireless communication apparatus
101 interface unit
102 transmission buffer
103 sequence management unit
104 reception buffer
105 transmission frame creation unit
106 wireless signal transmission processing unit
107 reception frame extraction unit
108 wireless signal reception processing unit
105 antenna control unit
111, 112 antenna element
120 control unit
121 block ACK request sequence setting unit
122 block ACK request sequence determination unit
123 block ACK transmission unit
124 block ACK reception unit
125 traffic determination unit
126 access control unit
190, 290 application
900 smartphone
901, 921 processor
913, 933, 963 wireless communication interface
919 auxiliary controller
920 car navigation apparatus
950 wireless access point
951 controller

The invention claimed is:

1. A wireless communication apparatus, comprising circuitry configured to
control transmission of a receipt acknowledgement request including information, the information specifying a data unit that requires a receipt acknowledgement response in a plurality of transmitted data units,
wherein the circuitry is configured to set the data unit whose timing of output to an application in a wireless communication apparatus being a transmission destination of the plurality of data units has come as a data unit that does not require the receipt acknowledgement response, and generate the information.

2. The wireless communication apparatus according to claim 1, wherein the circuitry is configured to generate the information according to a priority of each of the plurality of transmitted data units.

3. The wireless communication apparatus according to claim 2, wherein the circuitry is configured to generate the information on a basis of a reference priority, the reference priority being a reference regarding necessity of the receipt acknowledgement response.

4. The wireless communication apparatus according to claim 3, wherein the circuitry is configured to change the reference priority according to a situation of a wireless transmission path.

5. The wireless communication apparatus according to claim 4, wherein the circuitry is configured to change the reference priority according to an error rate of the wireless transmission path.

6. The wireless communication apparatus according to claim 5, wherein the circuitry is configured to change the reference priority when the error rate of the wireless transmission path rises.

7. The wireless communication apparatus according to claim 4, wherein the circuitry is configured to change the reference priority according to a congestion degree of the wireless transmission path.

8. The wireless communication apparatus according to claim 7, wherein the circuitry is configured to change the reference priority when the wireless transmission path is congested.

9. The wireless communication apparatus according to claim 3, wherein the circuitry is configured to change the reference priority according to a state of a transmission buffer that holds a data unit to be transmitted.

10. The wireless communication apparatus according to claim 9, wherein the circuitry is configured to change the reference priority when data units held in the transmission buffer reach a predetermined amount.

11. The wireless communication apparatus according to claim 1, wherein the circuitry is configured to change the information according to a situation of a wireless transmission path.

12. The wireless communication apparatus according to claim 11, wherein the circuitry is configured to generate, when the wireless transmission path is congested, the information in which the number of data units that require the receipt acknowledgement responses is changed.

13. The wireless communication apparatus according to claim 1, wherein the circuitry is configured to generate the information according to a state of a transmission buffer that holds data units to be transmitted.

14. The wireless communication apparatus according to claim 13, wherein the circuitry is configured to generate, when the data units held in the transmission buffer reach a predetermined amount, the information in which the number of data units that require the receipt acknowledgement responses is changed.

15. The wireless communication apparatus according to claim 1, wherein the circuitry is configured to determine that the timing has come by measuring an elapsed time after transmission of the plurality of data units.

16. A wireless communication apparatus, comprising circuitry configured to
control transmission of a receipt acknowledgement request including information, the information specifying a data unit that requires a receipt acknowledgement response in a plurality of transmitted data units,
wherein the circuitry is configured to specify the data unit, the data unit being the last transmitted data unit in the data units that are consecutively transmitted and do not require the receipt acknowledgement responses, as a data unit that does not require the receipt acknowledgement response.

17. The wireless communication apparatus according to claim 16, wherein the circuitry is configured to specify a data unit that requires the receipt acknowledgement response by using sequence numbers provided to the plurality of transmitted data units.

18. A wireless communication apparatus, comprising:
circuitry configured to
receive a plurality of data units and a receipt acknowledgement request including information, the information specifying a data unit that requires a receipt acknowledgement response in the plurality of data units; and
control, upon reception of a data unit other than the data unit that requires the receipt acknowledgement response based on the received receipt acknowledgement request, output of the data unit to an application,
wherein the circuitry is further configured to control transmission of a receipt acknowledgement for only the data unit in the plurality of received data units that requires the receipt acknowledgement response based on the received receipt acknowledgement request.

* * * * *